United States Patent
Au et al.

(10) Patent No.: US 11,391,830 B2
(45) Date of Patent: Jul. 19, 2022

(54) METHOD, APPARATUS, AND SYSTEM FOR QUALIFIED WIRELESS SENSING

(71) Applicants: Oscar Chi-Lim Au, San Jose, CA (US); Beibei Wang, Clarksville, MD (US); K. J. Ray Liu, Potomac, MD (US); Hung-Quoc Duc Lai, Parkville, MD (US); Feng Zhang, Greenbelt, MD (US); Chenshu Wu, Hong Kong (CN); David N. Claffey, Somerville, MA (US)

(72) Inventors: Oscar Chi-Lim Au, San Jose, CA (US); Beibei Wang, Clarksville, MD (US); K. J. Ray Liu, Potomac, MD (US); Hung-Quoc Duc Lai, Parkville, MD (US); Feng Zhang, Greenbelt, MD (US); Chenshu Wu, Hong Kong (CN); David N. Claffey, Somerville, MA (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 0 days.

(21) Appl. No.: 16/909,940

(22) Filed: Jun. 23, 2020

(65) Prior Publication Data

US 2020/0319324 A1 Oct. 8, 2020

Related U.S. Application Data

(63) Continuation-in-part of application No. 15/326,112, filed as application No. PCT/US2015/041037 on Jul.
(Continued)

(51) Int. Cl.
*G01S 13/00* (2006.01)
*G01S 13/50* (2006.01)
(Continued)

(52) U.S. Cl.
CPC ............ *G01S 13/003* (2013.01); *G01S 7/415* (2013.01); *G01S 13/50* (2013.01); *H04W 48/08* (2013.01); *H04W 56/001* (2013.01)

(58) Field of Classification Search
CPC combination set(s) only.
See application file for complete search history.

(56) References Cited

U.S. PATENT DOCUMENTS

| 2008/0077326 A1* | 3/2008 | Funk | G08B 25/016 |
| | | | 701/500 |
| 2012/0190379 A1* | 7/2012 | Hassan | G01S 19/34 |
| | | | 455/456.1 |

(Continued)

OTHER PUBLICATIONS

Wang et al., "We Can Hear You with Wi-Fi!", Sep. 2014, MobiCom '14: Proceedings of the 20th annual international conference on Mobile computing and networking, pp. 593-604 (Year: 2014).*

*Primary Examiner* — Zhiyu Lu

(57) ABSTRACT

Methods, apparatus and systems for qualified wireless sensing are described. In one embodiment, a described method comprises: transmitting a wireless signal from a Type 1 device to a Type 2 device through a wireless multipath channel of a venue; obtaining a time series of channel information (TSCI) of the wireless multipath channel based on the wireless signal; performing a qualification test based on the TSCI for at least one to-be-qualified device, which is at least one of: the Type 1 device, a module of the Type 1 device, an integrated circuit (IC) of the Type 1 device, the Type 2 device, a module of the Type 2 device, or an IC of the Type 2 device; determining that each of the at least one to-be-qualified device is a qualified device based on a determination that a respective qualification criterion associated with the to-be-qualified device is satisfied, to obtain at least one qualified device; and performing a task based on the TSCI using the at least one qualified device.

30 Claims, 2 Drawing Sheets

Related U.S. Application Data 17, 2015, and a continuation-in-part of application No. 16/127,151, filed on Sep. 10, 2018, which is a continuation-in-part of application No. PCT/US2017/021963, filed on Mar. 10, 2017, application No. 16/909,940, which is a continuation-in-part of application No. 16/125,748, filed on Sep. 9, 2018, now Pat. No. 10,833,912, which is a continuation-in-part of application No. PCT/US2017/015909, filed on Jan. 31, 2017, application No. 16/909,940, which is a continuation-in-part of application No. 15/861,422, filed on Jan. 3, 2018, and a continuation-in-part of application No. 16/200,608, filed on Nov. 26, 2018, now Pat. No. 10,735,298, and a continuation-in-part of application No. 14/446,589, filed on Jul. 30, 2014, now Pat. No. 10,006,246, and a continuation-in-part of application No. 16/667,648, filed on Oct. 29, 2019, and a continuation-in-part of application No. 16/667,757, filed on Oct. 29, 2019, and a continuation-in-part of application No. 16/790,610, filed on Feb. 13, 2020, and a continuation-in-part of application No. 16/790,627, filed on Feb. 13, 2020, and a continuation-in-part of application No. 16/798,337, filed on Feb. 22, 2020, and a continuation-in-part of application No. 16/798,343, filed on Feb. 22, 2020, and a continuation-in-part of application No. 16/870,996, filed on May 10, 2020, and a continuation-in-part of application No. 16/871,000, filed on May 10, 2020, and a continuation-in-part of application No. 16/871,004, filed on May 10, 2020, and a continuation-in-part of application No. 16/871,006, filed on May 10, 2020.

(60) Provisional application No. 62/868,782, filed on Jun. 28, 2019, provisional application No. 62/873,781, filed on Jul. 12, 2019, provisional application No. 62/900,565, filed on Sep. 15, 2019, provisional application No. 62/902,357, filed on Sep. 18, 2019, provisional application No. 62/950,093, filed on Dec. 18, 2019, provisional application No. 62/977,326, filed on Feb. 16, 2020, provisional application No. 62/980,206, filed on Feb. 22, 2020, provisional application No. 62/981,387, filed on Feb. 25, 2020, provisional application No. 62/984,737, filed on Mar. 3, 2020, provisional application No. 63/001,226, filed on Mar. 27, 2020, provisional application No. 63/038,037, filed on Jun. 11, 2020.

(51) Int. Cl.
*H04W 56/00* (2009.01)
*H04W 48/08* (2009.01)
*G01S 7/41* (2006.01)

(56) References Cited

U.S. PATENT DOCUMENTS

| | | | |
|---|---|---|---|
| 2012/0319903 A1* | 12/2012 | Huseth | G01S 3/74 |
| | | | 342/386 |
| 2013/0318282 A1* | 11/2013 | Wakutsu | G06F 3/06 |
| | | | 711/102 |
| 2015/0201434 A1* | 7/2015 | Fang | H04W 74/0816 |
| | | | 370/335 |
| 2016/0277529 A1* | 9/2016 | Chen | H04L 67/306 |
| 2017/0090026 A1* | 3/2017 | Joshi | G01S 13/56 |

* cited by examiner

METHOD, APPARATUS, AND SYSTEM FOR QUALIFIED WIRELESS SENSING

CROSS-REFERENCE TO RELATED APPLICATIONS

The present application hereby incorporates by reference the entirety of the disclosures of, and claims priority to, each of the following cases:
(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  (1) which is a continuation-in-part of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(d) U.S. patent application Ser. No. 15/861,422, entitled "METHOD, APPARATUS, SERVER, AND SYSTEMS OF TIME-REVERSAL TECHNOLOGY", filed on Jan. 3, 2018,
(e) U.S. patent application Ser. No. 16/200,608, entitled "METHOD, APPARATUS, SERVER AND SYSTEM FOR VITAL SIGN DETECTION AND MONITORING", filed on Nov. 26, 2018,
(f) U.S. patent application Ser. No. 16/446,589, entitled "METHOD, APPARATUS, AND SYSTEM FOR OBJECT TRACKING AND SENSING USING BROADCASTING", filed on Jun. 19, 2019,
(g) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019,
(h) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019,
(i) U.S. Provisional Patent application 62/900,565, entitled "QUALIFIED WIRELESS SENSING SYSTEM", filed on Sep. 15, 2019,
(j) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019,
(k) U.S. patent application Ser. No. 16/667,648, entitled "METHOD, APPARATUS, AND SYSTEM FOR WIRELESS PROXIMITY AND PRESENCE MONITORING", filed on Oct. 29, 2019,
(l) U.S. patent application Ser. No. 16/667,757, entitled "METHOD, APPARATUS, AND SYSTEM FOR HUMAN IDENTIFICATION BASED ON HUMAN RADIO BIOMETRIC INFORMATION", filed on Oct. 29, 2019,
(m) U.S. Provisional Patent application 62/950,093, entitled "METHOD, APPARATUS, AND SYSTEM FOR TARGET POSITIONING", filed on Dec. 18, 2019,
(n) U.S. patent application Ser. No. 16/790,610, entitled "METHOD, APPARATUS, AND SYSTEM FOR WIRELESS GAIT RECOGNITION", filed Feb. 13, 2020,
(o) U.S. patent application Ser. No. 16/790,627, entitled "METHOD, APPARATUS, AND SYSTEM FOR OUTDOOR TARGET TRACKING", filed Feb. 13, 2020.
(p) U.S. Provisional Patent application 62/977,326, entitled "METHOD, APPARATUS, AND SYSTEM FOR AUTOMATIC AND ADAPTIVE WIRELESS MONITORING AND TRACKING", filed on Feb. 16, 2020,
(q) U.S. patent application Ser. No. 16/798,337, entitled "METHOD, APPARATUS, AND SYSTEM FOR WIRELESS OBJECT SCANNING", filed Feb. 22, 2020,
(r) U.S. patent application Ser. No. 16/798,343, entitled "METHOD, APPARATUS, AND SYSTEM FOR WIRELESS OBJECT TRACKING", filed Feb. 22, 2020,
(s) U.S. Provisional Patent application 62/980,206, entitled "METHOD, APPARATUS, AND SYSTEM FOR WIRELESS SENSING", filed on Feb. 22, 2020,
(t) U.S. Provisional Patent application 62/981,387, entitled "METHOD, APPARATUS, AND SYSTEM FOR VEHICLE WIRELESS MONITORING", filed on Feb. 25, 2020,
(u) U.S. Provisional Patent application 62/984,737, entitled "METHOD, APPARATUS, AND SYSTEM FOR IMPROVED WIRELESS MONITORING", filed on Mar. 3, 2020,
(v) U.S. Provisional Patent application 63/001,226, entitled "METHOD, APPARATUS, AND SYSTEM FOR IMPROVED WIRELESS MONITORING AND USER INTERFACE", filed on Mar. 27, 2020,
(w) U.S. patent application Ser. No. 16/870,996, entitled "METHOD, APPARATUS, AND SYSTEM FOR WIRELESS INERTIAL MEASUREMENT", filed on May 10, 2020,
(x) U.S. patent application Ser. No. 16/871,000, entitled "METHOD, APPARATUS, AND SYSTEM FOR WIRELESS TRACKING WIT II GRAPH-BASED PARTICLE FILTERING", filed on May 10, 2020,
(y) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(z) U.S. patent application Ser. No. 16/871,006, entitled "METHOD, APPARATUS, AND SYSTEM FOR VITAL SIGNS MONITORING USING HIGH FREQUENCY WIRELESS SIGNALS", filed on May 10, 2020, (aa) U.S. Provisional Patent application 63/038,037, entitled "METHOD, APPARATUS, AND SYSTEM FOR MOTION LOCALIZATION, WALKING DETECTION AND DEVICE QUALIFICATION", filed on Jun. 11, 2020.

TECHNICAL FIELD

The present teaching generally relates to a qualified wireless sensing system, based on wireless channel information.

BACKGROUND

With the proliferation of Internet of Things (IoT) applications, billions of household appliances, phones, smart devices, security systems, environment sensors, vehicles and buildings, and other radio-connected devices will transmit data and communicate with each other or people, and everything will be able to be measured and tracked all the time. Among the various approaches to measure what is happening in the surrounding environment, wireless sensing has received an increasing attention in recent years because of the ubiquitous deployment of wireless radio devices. In addition, human activities affect wireless signal propagations, therefore understanding and analyzing the way how wireless signals react to human activities can reveal rich information about the activities around us. As more bandwidth becomes available in the new generation of wireless systems, wireless sensing will make many smart IoT applications only imagined today possible in the near future. That is because when the bandwidth increases, one can see many more multipaths, in a rich-scattering environment such as in indoors or metropolitan area, which can be treated as hundreds of virtual antennas/sensors.

SUMMARY

The present teaching generally relates to qualified wireless sensing. More specifically, the present teaching relates to a qualified wireless sensing system, based on wireless channel information.

In one embodiment, a method of a qualified wireless system is described. The method comprises: transmitting a wireless signal from a Type 1 device to a Type 2 device through a wireless multipath channel of a venue, wherein the Type 1 device and the Type 2 device are heterogeneous wireless devices; receiving the wireless signal by the Type 2 device; obtaining a time series of channel information (TSCI) of the wireless multipath channel based on the wireless signal; performing a qualification test based on the TSCI for at least one to-be-qualified device, which is at least one of: the Type 1 device, a module of the Type 1 device, an integrated circuit (IC) of the Type 1 device, the Type 2 device, a module of the Type 2 device, or an IC of the Type 2 device; determining that each of the at least one to-be-qualified device is a qualified device based on a determination that a respective qualification criterion associated with the to-be-qualified device is satisfied, to obtain at least one qualified device; and performing a task based on the TSCI using the at least one qualified device. The Type 2 device may transmit the TSCI (or a simplified or compressed version of TSCI) to the Type 1 device using the wireless multipath channel (e.g. in a return packet based on a standard such as 802.11), or another wireless channel, or via wired network.

In another embodiment, a qualified wireless system is described. The qualified wireless system comprises: a Type 1 heterogeneous wireless device configured for transmitting a wireless signal through a wireless multipath channel of a venue; a Type 2 heterogeneous wireless device configured for: receiving the wireless signal, obtaining a time series of channel information (TSCI) of the wireless multipath channel based on the wireless signal; and a processor communicatively coupled with a memory storing a set of instructions, and configured for: performing a qualification test based on the TSCI for at least one to-be-qualified device, which is at least one of: the Type 1 device, a module of the Type 1 device, an integrated circuit (IC) of the Type 1 device, the Type 2 device, a module of the Type 2 device, or an IC of the Type 2 device, determining that each of the at least one to-be-qualified device is a qualified device based on a determination that a respective qualification criterion associated with the to-be-qualified device is satisfied, to obtain at least one qualified device, and performing a task based on the TSCI using the at least one qualified device.

Other concepts relate to software for implementing the present teaching on qualified wireless sensing. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
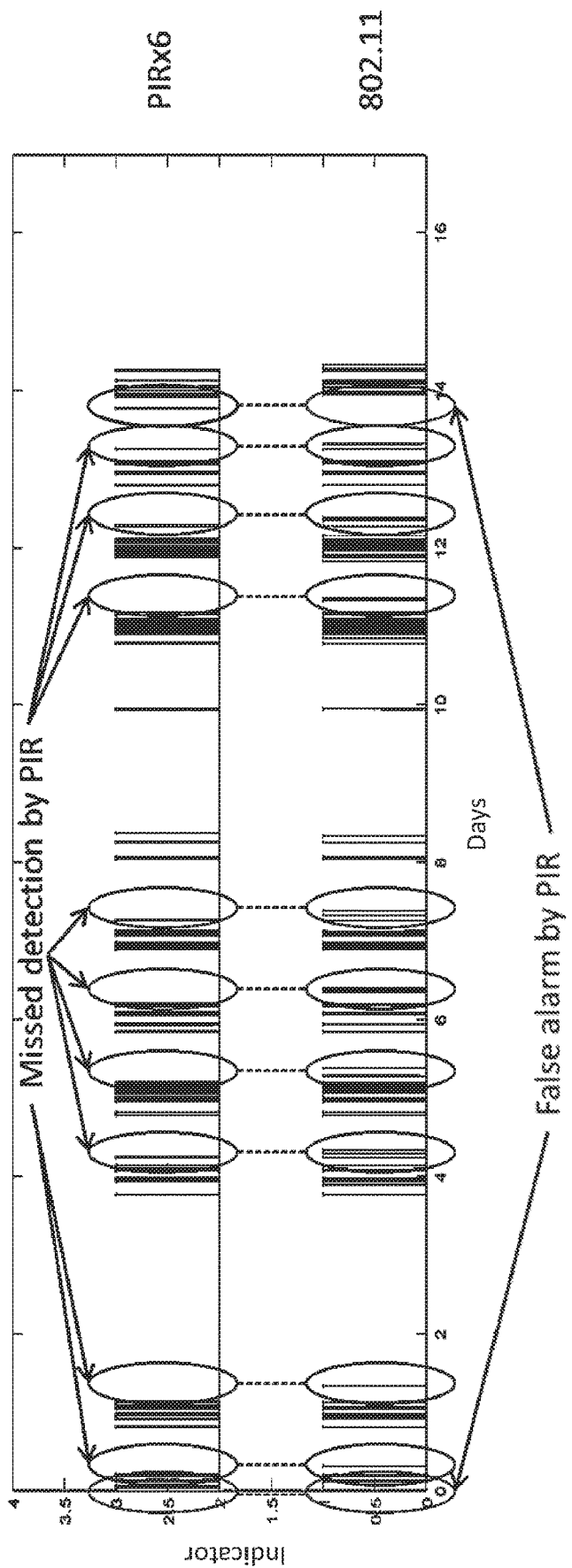
FIG. 1 shows exemplary performances of motion detections based on passive infrared (PIR) sensing and WiFi sensing, according to some embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of: a preamble, a header and a payload (e.g. for data/control/management in wireless links/networks). The TSCI may be extracted from a probe signal (e.g. training sequence, STF, LTF, L-STF, L-LTF, L-SIG, HE-STF, RE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of: electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of: Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI. The motion of the object may be monitored actively (in that Type 1 device, Type 2 device, or both, are wearable of/associated with the object) and/or passively (in that both Type 1 and Type 2 devices are not wearable off/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a re-training, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/system, a processor (e.g. logic unit), a memory communicatively coupled with the processor, and a set of instructions stored in the memory to be executed by the processor. Some processors, memories and sets of instructions may be coordinated. There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object. The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals. For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-story building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address. A location of a Type 2 device in the venue may be computed based on the particular MAC address, the series of probe signals, and/or the at least one TSCI obtained by the Type 2 device from the probe signals. The computing may be performed by the Type 2 device. The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel. The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different. The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same. The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time. The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSD, home device, office device, and/or manufacturing device. Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device. The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver). Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source. If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration. The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually. The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc. The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth. BLE, RFID, UWB, microwave system, radar like system). For example, one is WiFi and the other is LTE. The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/ may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.). For each of the multiple known events happening in the venue in a respective training (e.g. surveying, wireless survey, initial wireless survey) time period associated with the known event, a respective training wireless signal (e.g.

a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second. Type 2 heterogeneous wireless device through the channel in the venue in the current time period associated with the current event. At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device. A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined.

The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time $T_1$ may comprise at least one of: (1) a first function of the item at time $T_1$ and an item at time $T_1-D_1$, wherein $D_1$ is a pre-determined positive quantity (e.g. a constant time offset), (2) a second function of the item at time $T_1$ and an item at time $T_1+D_1$, (3) a third function of the item at time $T_1$ and an item at time $T_2$, wherein $T_2$ is a pre-determined quantity (e.g. a fixed initial reference time; $T_2$ may be changed (e.g. adjusted, varied, modified) over time; $T_2$ may be updated periodically; $T_2$ may be the beginning of a time period and $T_1$ may be a sliding time in the time period), and (4) a fourth function of the item at time $T_1$ and another item.

At least one of: the first function, the second function, the third function, and/or the fourth function may be a function (e.g. $F(X, Y, \ldots)$) with at least two arguments: X and Y. The two arguments may be scalars. The function (e.g. F) may be a function of at least one of: X, Y, (X−Y), (Y−X), abs(X−Y), $X\hat{}a$, $Y\hat{}b$, abs($X\hat{}a-Y\hat{}b$), $(X-Y)\hat{}a$, (X/Y), (X+a)/(Y+b), $(X\hat{}a/Y\hat{}b)$, and $((X/Y)\hat{}a-b)$, wherein a and b may be some predetermined quantities. For example, the function may simply be abs(X−Y), or $(X-Y)\hat{}2$, $(X-Y)\hat{}4$. The function may be a robust function. For example, the function may be $(X-Y)\hat{}2$ when abs (X−Y) is less than a threshold T, and (X−Y)+a when abs(X−Y) is larger than T. Alternatively, the function may be a constant when abs(X−Y)+a is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that $X=(x\_1, x\_2, \ldots, x\_n)$ and $Y=(y\_1, y\_2, \ldots y\_n)$. The function may be a function of at least one of: $x\_i$, $y\_i$, $(x\_i-y\_i)$, $(y\_i-x\_i)$, abs($x\_i-y\_i$), $x\_i\hat{}a$, $y\_i\hat{}b$, abs($x\_i\hat{}a-y\_i\hat{}b$), $(x\_i-y\_i)\hat{}a$, $(x\_i/y\_i)$, $(x\_i+a)/(y\_i+b)$, $(x\_i\hat{}a/y\_i\hat{}b)$, and $((x\_i/y\_i\hat{}a-b)$, wherein i is a component index of the n-tuple X and Y, and $1<=i<=n$. E.g. component index of $x\_1$ is i=1, component index of $x\_2$ is i=2. The function may comprise a component-by-component summation of another function of at least one of the following: $x\_i$, $y\_i$, $(x\_i-y\_i)$, $(y\_i-x\_i)$, abs($x\_i-y\_i$), $x\_i\hat{}a$, $y\_i\hat{}b$, abs($x\_i\hat{}a-y\_i\hat{}b$), $(x\_i-y\_i)\hat{}a$, $(x\_i/y\_i)$, $(x\_i+a)/(y\_i+b)$, $(x\_i\hat{}a/y\_i\hat{}b)$, and $((x\_i/y\_i)\hat{}a-b)$, wherein i is the component index of the n-tuple X and Y. For example, the function may be in a form of sum\_$\{i=1\}\hat{}n$ abs($x\_i/y\_i$)−1)/n, or sum\_$\{i=1\}\hat{}n$ $w\_i$*(abs($x\_i/y\_i$)−1), where $w\_i$ is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i\hat{}\{th\}$ domain item is mapped to the $j\hat{}\{th\}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated. The first section of the first time duration of the first TSCI may be a sliding section of the first TSCI. The second section of the second time duration of the second TSCI may be a sliding section of the second TSCI. A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%). In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one event, and/or the current TSCI, for the classifier. The classifier of the at least one event may be trained based on the projection and the training TSCI associated with the at least one event. The at least one current TSCI may be classified/categorized based on the projection and the current TSCI. The projection may be re-trained using at least one of: the dimension reduction method, and another dimension reduction method, based on at least one of: the training TSCI, at least one current TSCI before retraining the projection, and/or additional training TSCI. The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of: the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beam-forming information, transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, Objects, people, pets, etc. Each CI may be associated with a timestatnp. Each CI may comprise N1 components (e.g. N1 frequency domain components in CFR, N1 time domain components in CM, or N1 decomposition components) Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NTT, BLE, Zigbee, UWB, UMTS, 3GPP, GSM, EDGE, TDMA, TDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmit receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise:

numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dangle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object. The object itself may be communicatively coupled with some network, such as WiFi, MiFi, 3G/4G/LTE/5G/6G/7G, Bluetooth, NFC, BLE, WiMax, Zigbee, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UNITS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, rooftop, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space. The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA, devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-ti, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car). The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

A sensing-initiating device (e.g. the Type 1 device, the Type 2 device, another Type 1 device, another Type 2 device, a server, a client device, and/or a user device) may initiate a pair-wise "sensing session" by using standard-compliant/ protocol-compliant signaling to request (e.g. a point-to-point request using a control frame compliant with a standard such as WiFi) a sensing-responding device to perform a standard-compliant/protocol-compliant sounding task to support or enable one or more sensing tasks (e.g. the task). The sounding task includes transmitting the wireless signal (e.g. a series of probe signals) at a certain rate (sounding rate) from the Type 1 device to the Type 2 device through a wireless multipath channel of the venue, and generating the TSCI from the received wireless signal in the session. Between the sensing-initiating device and the sensing-responding device, one may function as the Type 1 device to transmit the wireless signal and the other as the Type 2 device to receive the wireless signal and extract TSCI for performing the task. Computation for the task may be performed in the initiating device, the responding device, or another device. The TSCI may need to be communicated to the task-computing device, which may need considerable data bandwidth. Alternatively, intermediate statistics/features needed for the task may be computed locally based on the TSCI (e.g. in the Type 2 device or a local device) and communicated to the task-computing device, which require less data bandwidth. The qualification test may be performed for the initiating device and/or the responding device (e.g. before or after the request).

For example, the initiating device may be "paired" with the responding device by a user using some pairing procedure (e.g. the user may use an app (application software) in a mobile phone or tablet or computer to connect locally to one of the devices and to establish communication linkage with a cloud server. The user may instruct the device to search for and pair with the other device. The user may press a button on the other device for the pairing). Both devices may be qualified during the pairing. A tentative sounding task setting for the task may be obtained.

In another example, the initiating device may be qualified long time ago (e.g. in design phase or manufacturing phase or in factory setting). The user may purchase it and install it in his/her home by setting it up to connect to internet, and to a cloud server through the internet. To find out any compatible sensing-responding devices in the home (e.g. perhaps upon the user pressing a button on the device or in some app on his/her smart device), the device may send out a wireless signal (e.g. a control frame based on a standard or a protocol) to search for any compatible sensing-responding devices and wait for any reply. Upon the sensing-responding device replying, pairing may be established between the two devices. The qualification test may be performed on the responding device. The two devices may exchange sounding/sensing capability and negotiate/handshake/arrange/obtain an appropriate sounding/sensing setting that both devices can support. They may decide which device would serve as the Type 1 device and which as the Type 2 device. The user may start a sensing session and start the sensing task (e.g. immediately by pressing a button or by setting up a time table for scheduled sensing), pause the task (pausing the session), terminate the task (ending the session), change sensing setting, add a new task (e.g. starting another sensing session, or in the same sensing session), end an existing task, etc.

In another example, the initiating device may not function as a Type 1 device or a Type 2 device. Instead, it may serve as a server and initiate a pair-wise sensing session between two responding devices. It may send one or two requests (e.g. one or two control frames compliant standard or protocol) to the two devices, with one to serve as Type 1 device to transmit the wireless signal (e.g. a series of sounding signals or probe signals) and the other as Type 2 device to receive the wireless signal and to extract the TSCI from the received signal. The one or two requests may contain identifications of the two responding devices (e.g. one field in the control frame for ID of each responding device), and an indication (e.g. a bit in the control frame) of which one being the Type 1 device and which one being the Type 2 device.

In yet another example, the initiating device may initiating a "group" sensing session by requesting (e.g. using one or more control frames compliant to a standard such as WiFi) a group of N sensing-responding devices to perform the sounding task and/or sensing task in a group. In one example, the initiating device may initiate pair-wise sensing session individually/separately with each of the group of N responding devices, each session comprising the initiating device and one responding device. In particular, the initiating device may send one request (e.g. using a control frame for each responding device) to each of the group of N responding devices (i.e. N individual requests for N devices). The request may contain an identification of the respective responding device and/or the respective sensing session. The initiating device may negotiate with each responding device to determine sounding/sensing settings including wireless signal setting and TSCI extraction setting (e.g. using control frames compliant to standard or protocol). Among the multiple pair-wise sensing session, the initiating device may coordinate/control/manage the transmission and/or reception (e.g. timing) of the wireless signals (e.g. series of probe signals), and extracting of TSCI from the wireless signals and any sharing of TSCI.

Alternatively, the initiating device may not function as a Type 1 device or a Type 2 device. Instead, it may function as a server and may initiate N pair-wise sensing sessions by sending N requests or 2N requests (e.g. control frame compliant to standard or protocol) separately/individually to N pairs of responding devices. Each request may include identification of the pair of devices (e.g. one field of a control frame for ID of one device) and an indication (e.g. a field or a bit of the control frame) of which device is the Type 1 device, and which is the Type 2. The request may include some sensing/sounding settings.

In another example, the initiating device may send a group request (e.g. one or more control frames compliant to standard or protocol) to the group of responding devices (i.e. one combined request for N devices). The group request (e.g. fields of the control frames in particular) may include identification information of each of the responding devices, and/or an ordering of any transmission among the responding devices. In the case that each of the responding devices need to transmit a respective wireless signal through the wireless multipath channel (or to send a respective CI or a respective TSCI), they may follow the specified order. All the wireless signals (e.g. each being a series of probe signals) may/may not have the same sounding rate. Their transmission order may be controlled/scheduled by the initiating device. The initiating device may further send triggering signal (e.g. control frame compliant to standard or protocol) to trigger/initiate respective transmission from respective responding device. The first responding device to respond may transmit immediately and may not need a triggering signal.

Alternatively, the initiating device may not function as a Type 1 device or a Type 2 device. Instead, it may function as a server and may send a group request (e.g. control frame compliant to standard or protocol) to N pairs of responding devices (one combined request for 2N devices). The group request (e.g. fields of the control frame) may include identification information of each pair of responding devices, an indication of which one in the pair to serve as Type 1 device and which as Type 2 device, and an ordering of transmission from the pair. The request may include some sensing/sounding settings. The initiating device may inform each pair of devices about the task and a requirement of the task (e.g. minimum sounding rate), and may instruct the two devices to negotiate to a commonly supported sensing/sounding setting that satisfy the task requirement. The initiating device may control/manage/coordinate other aspects of the sensing session (e.g. timing, TSCI format, TSCI sharing/preprocessing/processing, different algorithms to achieve the same task) by sending standard-compliant control frames.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/alarm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, post-processing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc. Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects. The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time. For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/STI/size/property/trait/habit/behavior, the venue, feature/fixture/furniture/barrier/material/machine/living thing/thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function. The regression analysis may minimize at least one of: error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost. The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.). The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc. The map (or environmental model) may be 2-dimensional, 3-dimensional and/or higher-dimensional. (e.g. a time varying 2D 3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-story town house in Seattle, Wash. Because his house has two storys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away. Sometime later, Stephen is convinced that the disclosed wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical. UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LIE chip, BLE chip), Wi-Fi chip (IC), LTE chip, BLE chip, device with mobile module, smart phone, companion device (e.g. dangle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, hard disk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internee) access. For example, it may be connected to broadband service through a wired connection (e.g. Ethernet, cable modem, ADSL/IDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RE chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming, (in Tx), such that the wireless signal is focused in certain direction for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect OR in a sliding window (e.g. 30 sec, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bulldozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including children/babies in the car. They may be used to count the passengers, recognize the driver, detect presence of passenger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, parking ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wearable/implant), each device either plugged into 12V accessory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-story parking facility, scattered locations to cover a big area such as factory/stadium/train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Any device may provide location information, through GPS, MAC layer, PHY layer, Wi-Fi, an IEEE 802.11 standard, 802.11a/b/g/n/ac/ad/at/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/b/2/2a/a/b/c/d/e/f/g/h/i/j/k/l/m/n/o/p/, standard, 802.16, Zigbee, WiMax, UWB, mobile channel, 1G/2G/3.5G/4G/LTE/5G/6G/7G/NBIoT, etc.

The present teaching discloses how to qualify a wireless system for achieving wireless sensing and how to distribute wireless sensing capability of IoT in a wireless mesh network (WMN).

An example of wireless sensing system is one that utilizes WiFi channel state information (CSI), as WiFi is one of the most popular wireless technology in nowadays. A 802.11 sensing, or WiFi sensing, is the use of 802.11 signals to sense (e.g. detect) events/changes in the environment. It can be utilized with signal processing and machine learning.

In one embodiment, a wireless transmitter (Tx) transmits an 802.11 signal to a wireless receiver (Rx) in a multipath-rich venue. The 802.11 signal bounces back and forth in the venue generating lots of multipaths. Although undesirable to communications, the bouncing of the 802.11 signal effectively "scan" or "sense" the venue. By monitoring the multipaths (e.g. through CSI), the disclosed system can detect target events and changes in the venue. This disclosed motion detection method does not require a line-of-sight (LOS) between the transmitter and the receiver, and can work in both LOS and Non-LOS (NLOS) situations. In most cases, the transmitter and the receiver are not required to be a wearable device. This provides new functionalities for 802.11-enabled devices (e.g. TV, speaker, router, IoT devices) and facilities (stadiums, halls, rooms, warehouse, factory); and provides new industry-wide business opportunities for all 802.11 related companies components/devices/services). The disclosed system does not need any dedicated hardware.

A passive infra-red (PIR) motion sensor may only work in a LOS scenario, and does not support machine learning. It needs many (e.g. 6) PIR sensors to cover an entire house. A video camera based on motion sensing may only work in a LOS scenario, and is intensive in terms of memory and computation. The video monitoring or recording intrudes human privacy. In contrast, a 802.11 sensing can work in both LOS and NLOS scenarios; only need 1 pair of transmitter and receiver to cover an entire house; can support machine learning; and has a much lower storage requirement and computation requirement compared to video camera based on motion sensing. In addition, there is no video to intrude privacy in the 802.11 sensing.

The 802.11 sensing can be applied in many scenarios: e.g. motion detection for intruder detection, security, smart IoT; breathing monitoring for sleep monitoring, well-being, care-giving; locationing/tracking for smart factory, indoor GPS companion, traffic planning; fall detection for older adults, accident detection, caregiving; child detection in hot cars for smart cars, accident prevention; presence/proximity detection for conference room, convenience, smart IoT; human identification for user identification, personalization, smart IoT; gesture recognition for smart office; and activity recognition for user interface. Many of these applications do not need a wearable device and can work in a contactless mode, and does not need video or a LOS requirement.

The 802.11 sensing can give business opportunities to service providers, device manufacturers (e.g. manufacturers of smart home/IoT devices, consumer electronics, computing devices, home appliance, lighting, accessories), and component providers. For example, the disclosed method can provide a new wave of "802.11 sensing" services, firmware, software and/or devices regarding daily living, safety, lifestyle, convenience, personalization, caregiving, digital health, etc., in a traditional mode (e.g. broadband, mobile, streaming, cable) or a new mode (e.g. smart device makers).

FIG. 1 shows exemplary performances of motion detections based on passive infrared (PIR) sensing and WiFi sensing, according to some embodiments of the present teaching. In a long-term side-by-side comparison with PIR, in a test house covered by 6 professionally installed PIRs and a pair of 802.11 Tx/Rx), 802.11 motion sensing performs better than the PIRs. As shown in FIG. 1, the PIR sensing and the 802.11 sensing have similar false alarm rates, while the 802.11 sensing has a better detection rate than the PIR sensing.

In a multi-night side-by-side comparison with other breathing sensors (pressure sensor, radar sensor, with PSG being ground truth), 802.11 breathing monitoring (contactless) outperforms pressure sensor and radar sensor, in terms of: stage (awake/REM/NREM) detection rate, and median (abs) error. In walking experiment along paths in buildings, 802.11 tracking (tracking based on 802.11 signal) shows high tracking accuracy, with an average (abs) tracking error being less than 20-30 cm, in a NLOS operation.

The bouncing of 802.11 signals creates multipaths which effectively scan or sense the environment, including any object motions, events and changes. The multipaths can be captured in channel state information (CSI). In 802.11 sensing, various signal processing/machine learning algorithms and systems may be applied to obtain and analyze CSI to achieve various tasks, regarding motions/events/changes, e.g. a motion detection by detecting change in CSI, a breathing detection by detecting cyclic behavior of CSI, a locationing by CSI recognition. Standardization may be needed for the systems regarding CSI generation, timing, accuracy, consistency, protocol, etc. Interface may also be standardized. Some 802.11 sensing demos use periodic probing/CSI generation at 1/10/100/1000 Hz, with sounding overhead less than 0.1% of available data bandwidth at 10 Hz. A protocol can be determined to control the generation of CSI, repetition rate, accuracy of timing, antenna selection and probing for 802.11 sensing, with CSI consistency, precision and format.

With standardized wireless sensing, devices from different manufacturers and different service providers can communicate with each other to estimate the CSI for wireless sensing in a venue, based on a qualification process as described herein. A database of qualified devices is maintained to include devices that have already been qualified for estimating CSI and performing a wireless sensing based on the CSI. Each qualified device in the database can access information related to any other qualified device in the database.

In one example, when the wireless environment of the venue becomes more complicated, e.g. due to more people entering the venue, a qualification test can be performed regarding a new device in the venue to add more qualified devices to improve wireless sensing accuracy. The qualification test may be performed based on a qualification criterion related to one or more CSI samples obtained using the new device and a qualified device in the database. For example, the new device is determined to be qualified when a CSI obtained from a wireless signal transmitted between the new device and the qualified device is good enough or better than a predetermined threshold. In another example, the new device is determined to be qualified when two CSIs obtained from wireless signals transmitted at two different times between the new device and the qualified device are close enough, e.g. when a similarity score between the two CSIs is greater than a first threshold, or when a distance score between the two CSIs is less than a second threshold.

Figure 2:
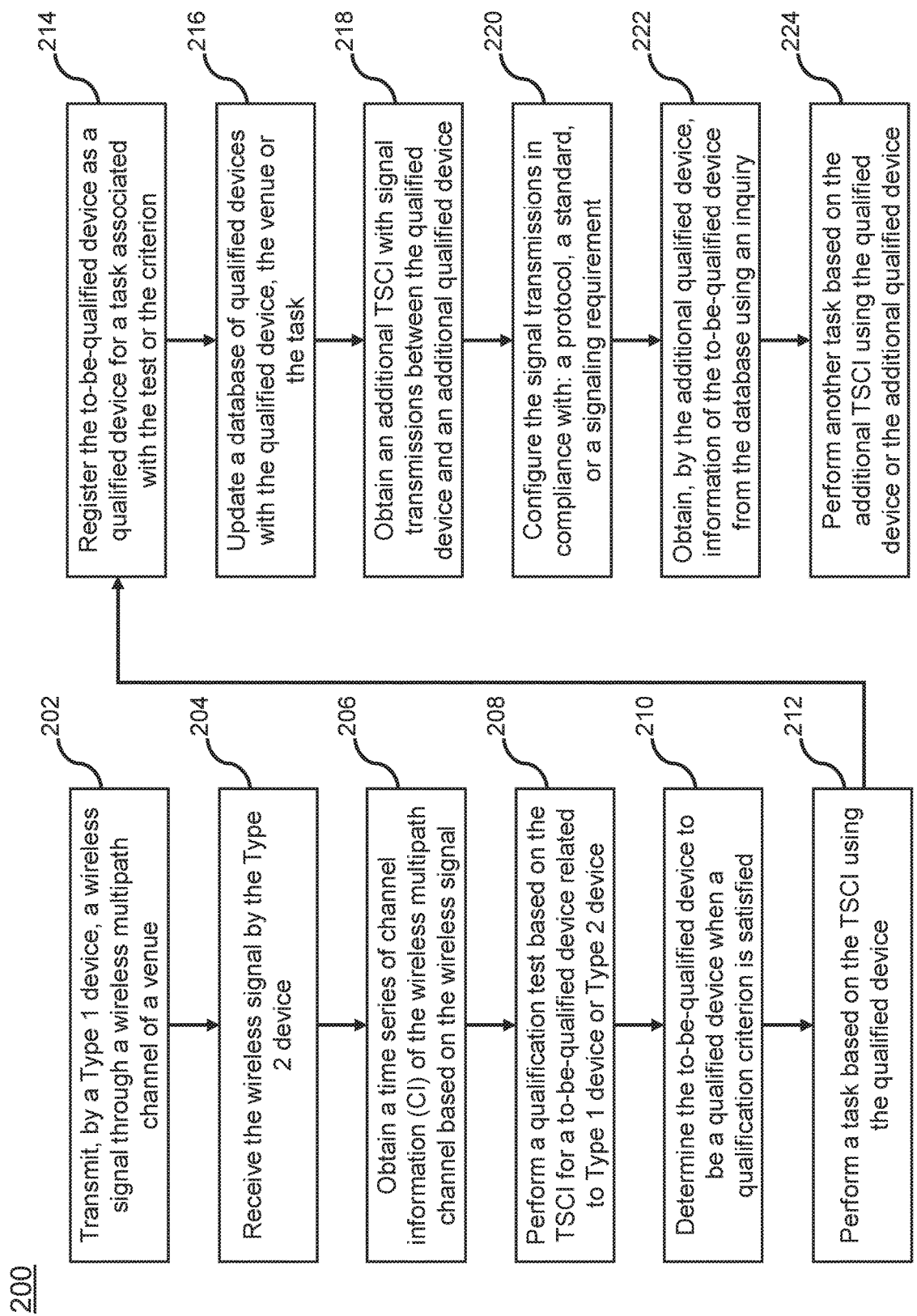
FIG. 2 illustrates a flow chart of an exemplary method of a qualified wireless sensing system, according to some embodiments of the present teaching.

FIG. 2 illustrates a flow chart of an exemplary method 200 of a qualified wireless sensing system, according to some embodiments of the present teaching, At operation 202, a wireless signal is transmitted by a Type 1 device through a wireless multipath channel of a venue. At operation 204, the wireless signal is received by the Type 2 device. At operation 206, a time series of channel information (CI) of the wireless multipath channel is obtained based on the wireless signal. At operation 208, a qualification test is performed based on the TSCI for a to-be-qualified device related to Type 1 device or Type 2 device. At operation 210, the to-be-qualified device is determined to be a qualified device when a qualification criterion is satisfied. At operation 212, a task is performed based on the TSCI using the qualified device. A to-be-qualified device may be a previously or currently qualified device that needs a re-qualification. For example, the qualified device may be re-qualified (1) after a power down and power up cycle, or (2) after some wireless network disruption/failure/traffic condition/jam, or (3) after some internet disruption/failure/traffic condition/jam, or (4) upon receiving a request/command/control from a device (e.g. some Type 1 device, some Type 2 device, some device in the venue, some server, or some user device), or (5) periodically, regularly, sporadically, irregularly, upon request, or in some condition, or (6) a change in the task (e.g. task initiation, task termination, new task, more than one simultaneous tasks, task modification, spontaneous events, timed events, scheduled events, planned events, time-out). Multiple to-be-qualified devices may be qualified simultaneously, contemporaneously, independently, dependently, collaboratively, individually, or jointly.

At operation 214, the to-be-qualified device is registered as a qualified device for a task associated with the test or the criterion. At operation 216, a database of qualified devices is updated with the qualified device, the venue or the task. At operation 218, an additional TSCI is obtained with signal transmissions between the qualified device and an additional qualified device. At operation 220, the signal transmissions are configured in compliance with: a protocol, a standard, or a signaling requirement. At operation 222, information of the to-be-qualified device is obtained from the database using an inquiry by the additional qualified device. At operation 224, another task is performed based on the additional TSCI using the qualified device or the additional qualified device. The order of the operations in FIG. 2 may be changed in various embodiments of the present teaching.

A device may be "qualified" if the CSI satisfies a criterion. A qualified wireless system may be a standard-compliant wireless system, or a system that operates in a way defined by a standard. For example, a Type 2 device is qualified (e.g. compliant to a standard, or satisfy a requirement of a standard such as WiFi, 4G/5G/6G/7G/8G) if a first CI and a second CI are "close" to each other when there is no change (e.g. no object motion) in the venue. Type 1 device may be transmitter (Tx, or "Bot"). Type 2 device may be receiver (Rx, or "Origin"). A Type 1 device may be a Type 2 device, and vice versa.

In various embodiments of the present teaching, an exemplary method of a qualified wireless system is disclosed in the following clauses.

Clause 1. A method of a qualified wireless system, comprising: transmitting a wireless signal from a Type 1 heterogeneous wireless device to a Type 2 heterogeneous wireless device through a wireless multipath channel of a venue; receiving the wireless signal by a Type 2 heterogeneous wireless device; obtaining a time series of channel information (CI) of the wireless multipath channel based on the wireless signal using a processor of the Type 2 device, a memory communicatively coupled with the process and a set of instructions stored in the memory; and making the TSCI available for a task, wherein at least one of: the Type 1 device, a module of the Type 1 device, an integrated circuit (IC) of the Type 1 device, the Type 2 device, a module of the Type 2 device, and an IC of the Type 2 device, is qualified if a respective qualification criterion is satisfied.

Clause 2. The method of the qualified wireless system of clause 1: wherein the Type 1 device and the Type 2 device are placed at two different locations in the venue.

Clause 3. The method of the qualified wireless system of clause 1: wherein the Type 1 device and the Type 2 device are collocated, being placed at the similar locations in the venue.

Clause 4. The method of the qualified wireless system of clause 3: wherein the Type 1 device and the Type 2 device are the same device.

Clause 5. The method of the qualified wireless system of clause 1: wherein there are more than one pairs of Type 1 device and Type 2 device in the venue, each respective Type device of a pair receiving a respective wireless signal asynchronously from the respective Type 1 device of the pair and obtaining asynchronously a respective TSCI; wherein the Type 1 device and the Type 2 device of a first pair are collocated; wherein the Type 1 device and the Type 2 device of a second pair are placed at two different locations in the venue.

Clause 6. The method of the qualified wireless system of clause 1: associating at least one of: the Type 1 device and the Type 2 device, with an identifier (ID).

Clause 7. The method of the qualified wireless system of clause 6: wherein the ID comprises at least one of: a name, a number, an alphanumeric ID, a string of text, numbers and symbols, a file, a database, an item of the database, a pointer to the item, a link to a webpage, a link to a storage, a MAC address, an IP address, a network address, a network ID, a domain ID, a web ID, an internet ID, a mobile network ID, a LAN ID, a platform ID, a software ID, a software application ID, an administration ID, a supervision ID a hardware ID, a device ID, a device profile, a hardware component ID, a computer ID, a processor ID, a storage ID, a process ID, a serial number, a task ID, a class, a class information, a category, a category information, a performance information, a capability information, a policy information, a pair ID of the Type 1 device and the Type 2 device, a pair profile, a link ID, a link profile, an antenna ID, an antenna profile, a system ID, a user, a customer, a supervisor, super-user, an administrator, a guardian, a service, an account, a password, a service account, a user account, a user profile, a user name, a user password, a user information, a user ID, a service provider, a service profile, a manufacturer, a sales channel, a vendor, a retailer, a distribution channel, a content channel, an Apple ID, a Amazon ID, a Samsung ID, a Google ID, a Facebook ID, a Microsoft ID, a company ID, a service ID, a service provider ID, a service ID, an access ID, a hash of another ID, a user association, a user grouping, an account privilege, a user history, a task, a task ID, a task information, a task requirement, a user associated with the task, a physical address, a physical location, a home, a household, an office, a company, a school, a warehouse, a store, a factory, a station, a stadium, a hall, an enclosure, a venue, a site, a district, a zone, a region, an area, a proximity, a neighborhood, a map, a map location, a location-based information, a street, a city, a county, a state, a province, a precinct, a prefecture, a country, a continent, a zip code, a postal code, a GPS coordinate, another code, a phone number, a payment card information, a grouping, a classification, a category, and another ID.

Clause 8. The method of the qualified wireless system of clause 6, further comprising: sharing the ID between any two of: the Type 1 device, the Type 2 device, another wireless heterogeneous device and a user device.

Clause 9. The method of the qualified wireless system of clause 8, further comprising: sharing the ID based on at last one of: a standard, a WiFi standard, a WLAN standard, a mesh network standard, an IEEE standard, an IEEE 802 standard, an IEEE 802.11 standard, an IEEE 802.15 standard, an IEEE 802.16 standard, a WiFi Alliance specification, a 3GPP standard, a mobile communication standard, a cellular communication standard, 3G/4G/LTE/5G/6G/7G/8G, an international standard, a national standard, an industry standard, a de facto standard, a protocol, a handshake, an enquiry, a response, an acknowledge, a database, another format, another channel, another exchange and another mechanism.

Clause 10. The method of the qualified wireless system of clause 6: wherein the ID is time-varying. How the ID varies over time. Standardization.

Clause 11. The method of the qualified wireless system of clause 10: wherein the time-varying ID varies over time based on at least one of: a standard, a protocol, an established protocol, an interoperable protocol, a specification, a requirement, a qualification requirement, the qualification criterion, a protocol agreed by the Type 1 device and the Type 2 device, a timing agreed by the Type 1 device and the Type 2 device, a timing based on at least one of: the standard and the protocol, a strategy, a time table, a user setting, a user request, a control by a server, the Type 1 device, the Type 2 device, another device, the server, a control signal communicated between two of: the Type 1 device, the Type 2 device, the another device, the server, another Type 1 device, another Type 2 device, a situation, a condition of the wireless multipath channel, another criterion, and another mechanism.

Clause 12. The method of the qualified wireless system of clause 1, further comprising: transmitting a first part of the wireless signal by the Type 1 device using at least one of: a first carrier frequency, a first channel, a first antenna, and a first group of antennas, of the Type 1 device; and transmitting a second part of the wireless signal by the Type 1 device using at least one of: a second carrier frequency, a second channel, a second antenna, and a second group of antennas, of the Type 1 device.

Clause 13. The method of the qualified wireless system of clause 12, further comprising wherein the first part and the second part of the wireless signal are transmitted by the Type 1 device in at least one of the following manner: coordinated, un-coordinated, independent, together, un-separated, separated, simultaneous, contemporaneous, non-simultaneous, at the same time, at different time, synchronized, and non-synchronized.

Clause 14. The method of the qualified wireless system of clause 12: wherein the first carrier frequency and the second carrier frequency are at least one of: the same and different.

Clause 15. The method of the qualified wireless system of clause 12: wherein the first channel and the second channel are at least one of: the same channel, overlapping channels, and different channels.

Clause 16. The method of the qualified wireless system of clause 12: wherein the first antenna and the second antenna are at least one of: the same antenna, and different antennas.

Clause 17. The method of the qualified wireless system of clause 12: wherein the first group of antennas and the second group of antennas are at least one of: the same group of antennas, overlapping groups of antennas, and disjoint groups of antennas. Characteristics negotiated/arranged between Type 1 device and Type 2 device. E.g. characteristics may be probing/sounding frequency, probing/sounding timing, carrier frequency, channel, antenna, group of antenna, response to congestion, what CSI to get, and/or precision/format/consistency/accuracy of CSI, etc.

Clause 18. The method of the qualified wireless system of clause 12: wherein a first characteristics of the first part of the wireless signal and a second characteristics of the second part of the wireless signal are at least one of: determined, worked out, exchanged, hand-shaked, shared, negotiated, arranged, and coordinated, among at least two of: the Type 1 device, the Type 2 device and another device.

Clause 19. The method of the qualified wireless system of clause 18: wherein the first characteristics of the first part of the wireless signal and the second characteristics of the second part of the wireless signal are at least one of: determined, worked out, exchanged, hand-shaked, shared, negotiated, arranged, and coordinated, based on at least one of: a standard, a protocol, an established protocol, an interoperable protocol, a specification, a requirement, a qualification requirement, the qualification criterion, a protocol agreed by the Type 1 device and the Type 2 device, a timing agreed by the Type 1 device and the Type 2 device, a timing based on at least one of: the standard and the protocol, a strategy, a time table, a user setting, a user request, a control by a server, the Type 1 device, the Type 2 device, another device, the server, a control signal communicated between two of: the Type 1 device, the Type 2 device, the another device, the server, another Type 1 device, another Type 2 device, a situation, a condition of the wireless multipath channel, another criterion, and another mechanism.

Clause 20. The method of the qualified wireless system of clause 1, further comprising: receiving a first part of the wireless signal by the Type 2 device using at least one of: the first carrier frequency, the first channel, a third antenna, and a third group of antennas, of the Type 2 device; and receiving a second part of the wireless signal by the Type 2 device using at least one of: the second carrier frequency, the second channel, a fourth antenna, and a fourth group of antennas, of the Type 2 device.

Clause 21. The method of the qualified wireless system of clause 20: wherein the first part and the second part of the wireless signal are received by the Type 2 device in at least one of the following manner: coordinated, un-coordinated, independent, together, un-separated, separated, simultaneous, contemporaneous, non-simultaneous, at the same time, at different time, synchronized, and non-synchronized.

Clause 22. The method of the qualified wireless system of clause 20: wherein the third antenna and the fourth antenna of the Type 2 device are at least one of: the same antenna, and different antennas.

Clause 23. The method of the qualified wireless system of clause 20: wherein the third group of antennas and the fourth group of antennas of the Type 2 device are at least one of: the same group of antennas, overlapping groups of antennas, and disjoint groups of antennas.

Clause 24. The method of the qualified wireless system of clause 1, further comprising: transmitting the wireless signal from the Type 1 device to a second Type 2 device, wherein a first part of the wireless signal is intended for the Type 2 device, wherein a second part of the wireless signal is intended for the second Type 2 device; transmitting the first part of the wireless signal by the Type 1 device using at least one of: a first carrier frequency, a first channel, a first antenna, and a first group of antennas, of the Type 1 device; and transmitting the second part of the wireless signal by the Type 1 device using at least one of: a second carrier frequency, a second channel, a second antenna, and a second group of antennas, of the Type 1 device.

Clause 25. The method of the qualified wireless system of clause 24: wherein the first part and the second part of the wireless signal are transmitted by the Type 1 device in at least one of the following manner: coordinated, un-coordinated, independent, together, un-separated, separated, simultaneous, contemporaneous, non-simultaneous, at the same time, at different time, synchronized, and non-synchronized.

Clause 26. The method of the qualified wireless system of clause 24: wherein the first carrier frequency and the second carrier frequency are at least one of: the same and different.

Clause 27. The method of the qualified wireless system of clause 24: wherein the first channel and the second channel are at least one of: the same channel, overlapping channels, and different channels.

Clause 28. The method of the qualified wireless system of clause 24: wherein the first antenna and the second antenna of the Type 1 device are at least one of: the same antenna, and different antennas.

Clause 29. The method of the qualified wireless system of clause 24: wherein the first group of antennas and the second group of antennas of the Type 1 device are at least one of: the same group of antennas, overlapping groups of antennas, and disjoint groups of antennas. Characteristics negotiated/arranged between Type 1 device and Type 2 device.

Clause 30. The method of the qualified wireless system of clause 24: wherein a first characteristics of the first part of the wireless signal and a second characteristics of the second part of the wireless signal are at least one of: determined, worked out, exchanged, hand-shaped, shared, negotiated, arranged, and coordinated, among at least two of: the Type 1 device, the Type 2 device, the second Type 2 device, and another device.

Clause 31. The method of the qualified wireless system of clause 30: wherein the first characteristics of the first part of the wireless signal and the second characteristics of the second part of the wireless signal are at least one of: determined, worked out, exchanged, hand-shaked, shared, negotiated, arranged, and coordinated, based on at least one of: a standard, a protocol, an established protocol, an interoperable protocol, a specification, a requirement, a qualification requirement, the qualification criterion, a protocol agreed by the Type 1 device and the Type 2 device, a timing agreed by the Type 1 device and the Type 2 device, a timing based on at least one of: the standard and the protocol, a strategy, a time table, a user setting, a user request, a control by a server, the Type 1 device, the Type 2 device, another device, the server, a control signal communicated between two of: the Type 1 device, the Type 2 device, the another device, the server, another Type 1 device, another Type 2 device, a situation, a condition of the wireless multipath channel, another criterion, and another mechanism.

Clause 32. The method of the qualified wireless system of clause 24: wherein the first part of the wireless signal is received by the Type 2 device using at least one of: the first carrier frequency, the first channel, a third antenna, and a third group of antennas, of the Type 2 device, wherein the second part of the wireless signal is received by the second Type 2 device using at least one of: the second carrier frequency, the second channel, a fourth antenna, and a fourth group of antennas, of the second Type 2 device.

Clause 33. The method of the qualified wireless system of clause 1, further comprising: transmitting a second wireless signal from a second Type 1 device to the Type 2 device; receiving the wireless signal by the Type 2 device using at least one of: a first carder frequency, a first channel, a first antenna, and a first group of antennas, of the Type 2 device; and receiving the second wireless signal by the Type 2 device using at least one of: a second carrier frequency, a second channel, a second antenna, and a second group of antennas, of the Type 2 device.

Clause 34. The method of the qualified wireless system of clause 33: wherein the first wireless signal and the second wireless signal are transmitted by the Type 1 device and the second Type 1 device respectively in at least one of the following manner: coordinated, un-coordinated, independent, together, un-separated, separated, simultaneous, contemporaneous, non-simultaneous, at the same time, at different time, synchronized, and non-synchronized.

Clause 35. The method of the qualified wireless system of clause 31: wherein the first carrier frequency and the second carrier frequency are at least one of: the same and different.

Clause 36. The method of the qualified wireless system of clause 31: wherein the first channel and the second channel are at least one of: the same channel, overlapping channels, and different channels.

Clause 37. The method of the qualified wireless system of clause 31: wherein the first antenna and the second antenna of the Type 2 device are at least one of: the same antenna, and different antennas.

Clause 38. The method of the qualified wireless system of clause 31: wherein the first group of antennas and the second group of antennas of the Type 2 device are at least one of: the same group of antennas, overlapping groups of antennas, and disjoint groups of antennas. Characteristics negotiated/arranged among Type 1 device, second Type 1 device and Type 2 device.

Clause 39. The method of the qualified wireless system of clause 31: wherein at least one of: a first characteristics of the wireless signal and a second characteristics of the second wireless signal is at least one of: determined, worked out, exchanged, hand-shaked, shared, negotiated, arranged, and coordinated, among at least two of: the Type 1 device, the second Type 1 device, the Type 2 device, and another device.

Clause 40. The method of the qualified wireless system of clause 39: wherein at least one of: the first characteristics of the wireless signal and the second characteristics of the second wireless signal is at least one of: determined, worked out, exchanged, hand-shaked, shared, negotiated, arranged, and coordinated, based on at least one of: a standard, a protocol, an established protocol, an interoperable protocol, a specification, a requirement, a qualification requirement, the qualification criterion, a protocol agreed by the Type 1 device and the Type 2 device, a timing agreed by the Type 1 device and the Type 2 device, a timing based on at least one of: the standard and the protocol, a strategy, a time table, a user setting, a user request, a control by a server, the Type 1 device, the Type 2 device, another device, the server, a control signal communicated between two of: the Type 1 device, the Type 2 device, the another device, the server, another Type 1 device, another Type 2 device, a situation, a condition of the wireless multipath channel, another criterion, and another mechanism.

Clause 41. The method of the qualified wireless system of clause 1: wherein the wireless signal comprises at least one of: an electromagnetic (EM) wave, a radio frequency (RF) signal, a RF transmission, a RF signal transmitted by one or more transmitting antennas, a RF signal received by one or more receiving antennas, a RF signal repeated by a RF repeater, a RF signal retransmitted by a RF repeater, a 800/900 MHz signal, a 1.8/1.9 GHz signal, a 2.4 GHz signal, a 5 GHz signal, a 6 GHz signal, a 24 GHz signal, a 76-81 GHz signal, a 28 GHz signal, a 60 GHz signal, a 122 GHz signal, a 244 GHz signal, a microwave signal, an infrared signal, a light signal, an ultraviolet signal, an audio signal, an OFDM signal, a CDMA signal, a FDMA signal, a TDMA signal, an OFDMA signal, a MIMO signal, a MU-MIMO signal, a QAM signal, a 4-QAM, a 8-QAM, a 16-QAM, a 32-QAM, a 64-QAM, a 128-QAM, a 256-QAM, a 512-QAM, a 1024-QAM, a 2048-QAM, a 4096-QAM, a 8192-QAM, a 16384-QAM, a 32768-QAM, a 65536-QAM, a WiFi signal, an IEEE 802 compliant signal, an IEEE 802.11 signal, an 802.15 signal, an IEEE 802.16 signal, a standard compliant signal, a wireless local area network (WLAN) signal, a Zigbee signal, a Bluetooth signal, an RFID signal, a cellular network signal, a 3GPP compliant signal, a 3G/4G/LTE/5G/6G/7G/8G signal, a cellular communication signal, an RF signal that uses an ISM band, an RF signal that uses an unlicensed band, an RF signal that uses a licensed band, a GPS signal, a baseband signal, a bandlimited signal, an ultra-wide band (UWB) signal, a wireless standard-compliant signal, a frequency-hopping signal, a burst signal, a train of signals, a steady stream of signals, a stream of signals with irregular timings, a stream of signals with regular timings, a null signal, a protocol signal, a protocol compliant signal, a data signal, a control signal, a beacon signal, a pilot signal, a probe signal, an excitation signal, an illumination signal, a reference signal, a training signal, a synchronization signal, a request signal, a enquiry signal, a response signal, an acknowledgement signal, a downlink signal, an uplink signal, a unicast signal, a multicast signal, a broadcast signal, a pulsed signal, a signal burst, a motion probe signal, a motion detection signal, a motion sensing signal, a line-of-sight (LOS) signal, a non-line-of-sight (NLOS) signal, a combination of signals, a mixture of signals, a succession of signals, a series of signals, and another wireless signal.

Clause 42. The method of the qualified wireless system of clause 41: wherein the wireless signal comprises at least one of: a response to a second wireless signal transmitted from at least one of: the Type 2 device, another Type 1 device, another Type 2 device, and another wireless device, to the Type 1 device, a response to at least one of: a request signal, a query signal, a probe-request signal, a command signal, a control signal, a data signal, a non-wireless signal, an electronic signal, and another signal, received by the Type 1 device, an acknowledgement to the another wireless signal, a protocol signal, a handshake signal, an enquiry signal, a request signal, a query signal, a probe-request signal, a command signal, a control signal, a data signal, a response signal, a probe response signal, an acknowledgement signal, a reply signal, a beacon signal, a pilot signal, a probe signal, a sounding signal, a broadcast signal, a train of signals, and a part of a handshake between the Type 1 device and the Type 2 device.

Clause 43. The method of the qualified wireless system of clause 42, further comprising: wherein the wireless signal comprises a series of sounding signals, controlling at least one of: a timing, an appearance, a generation, a repetition, a repeated occurrence, a regular occurrence, a cyclic occurrence, a periodic occurrence, an occurrence with a regular interval, a sounding interval, a sounding period, a sounding rate, a sounding timing, and another aspect, of the sounding signals of the wireless signal based on the second wireless signal.

Clause 44. The method of the qualified wireless system of clause 43, further comprising: wherein the second wireless signal comprises a series of probe-request signals, wherein each sounding signal is a probe-response signal to a respective probe-request signal of the second wireless signal, controlling at least one of: the timing, the appearance, the generation, the repetition, the repeated occurrence, the regular occurrence, the cyclic occurrence, the periodic occurrence, the occurrence with a regular interval, the sounding interval, the sounding period, the sounding rate, the sounding timing, and the another aspect, of the sounding signals of the wireless signal by controlling at least one of: a timing, an appearance, a generation, a repetition, a repeated occurrence, a regular occurrence, a cyclic occurrence, a periodic occurrence, an occurrence with a regular interval, a sounding interval, a sounding period, a sounding rate, a sounding timing, and another aspect, of the probe-request signals of the second wireless signal.

Clause 45. The method of the qualified wireless system of clause 1, further comprising: wherein the wireless signal is at least one of: a response, a reply, an acknowledgement, and a handshake, to a second wireless signal, controlling a characteristics of the wireless signal by controlling corresponding characteristics of the second wireless signal.

Clause 46. The method of the qualified wireless system of clause 42, further comprising controlling at least one timing of the wireless signal by controlling at least one timing of the second wireless signal.

Clause 47. The method of the qualified wireless system of clause 42, further comprising: controlling at least one rate of the wireless signal by controlling at least one corresponding rate of the second wireless signal.

Clause 48. The method of the qualified wireless system of clause 1: wherein the wireless signal comprises a series of probe signals (or sounding signal or beacon signal or pilot signal), wherein each CI of the TSCI is obtained based on a corresponding probe signal.

Clause 49. The method of the qualified wireless system of clause 43: wherein the series of probe signals comprise at least one of: a steady stream of probe signals, a locally-steady stream of probe signals, a locally-absence of probe signals, a momentarily-steady stream of probe signals, a momentary absence of probe signals, a burst of probe signals, a pause of probe signals, a first steady stream (or wave, or train, or succession) of probe signals associated with a first rate, a second steady stream (or wave, or train, or succession) of probe signals associated with a second rate, a probe signal associated with a target transmission time, a probe signal transmitted by the Type 1 device at the target transmission time, a late probe signal, a probe signal transmitted after the target transmission time, a late probe signal that is late due to congestion of the wireless multi path channel, a late probe signal that is late because the wireless multipath channel is used by another device, a lost probe signal, a probe signal not received successfully by the Type 2 device, a protocol signal, a data signal, a control signal, a beacon signal, a pilot signal, an excitation signal, an illumination signal, a reference signal, a training signal, a synchronization signal, a handshake signal, a request signal, an enquiry signal, a response signal, a probe request signal, a probe enquiry signal, a probe response signal, an acknowledgement signal, a synchronization signal, a training signal, a reference signal, a unicast signal, a multi-cast signal, a broadcast signal, an uplink signal, an downlink signal, a pulsed signal, a signal burst, a data frame, a control frame, a beacon frame, a pilot frame, a beacon frame in a primary channel, a probe request frame, a probe response frame, a unicast frame, a multicast frame, a broadcast frame, a frame with a header, a frame with a preamble, a frame with a data payload, an IEEE 802.11 frame, a FHSS frame, a DSSS frame, an OFDM frame, a HR-DSSS frame, an ERP-OFDM frame, a DSSS-OFDM frame, an ERP-PBCC frame, an HT-OFDM frame, a VHT-OFDM frame, a HE-OFDM frame, a DMG frame, an EDMG frame, a TVHT frame, an SIG frame, a WUR frame, an IR frame, an IEEE 802.11 MAC protocol data unit (MPDU), an IEEE 802.11 PHY protocol data unit (PPDU), an IEEE 802.11 PLCP Service Data Unit (PSDU), and another frame.

Clause 50. The method of the qualified wireless system of clause 43: wherein a timing is associated with at least one of: the series of probe signals, the TSCI, the transmission of the series of probe signals by the Type 1 device, the reception of the series of probe signals by the Type 2 device, at least one of: a channel condition, a channel state, a channel usage information of the wireless multipath channel, and at least one of: a condition and a state, of the TSCI; wherein the timing comprises at least one of: a timing associated with the transmission of a probe signal from the Type 1 device, a timing associated with the reception of the probe signal by the Type 2 device, a timing associated with the transmission of the series of probe signals from the Type 1 device, a timing associated with the reception of the series of probe signals by the Type 2 device, a timing associated with the task, a timing associated with a requirement of the task, a timing associated with a user requirement of the task, a timing required for the task to achieve a performance level, a timing associated with a requirement of the task regarding at least one of: a frequency, a period, a starting time, an ending time, a pause, a stand-by, a power-down, a sleep, a power-up, a wake-up, an alarm, an alert, a notification, a schedule, a plan, a time table, a control, a signaling, a request, an enquiry, an acknowledgement, a response, an event, a triggering event, a triggering condition, a triggering situation, and another timing feature, a timing associated with at least one of: a request, an enquiry, a response, and an acknowledgement, based on the task, a timing associated with a control signal sent between at least two of: the Type 1 device, the Type 2 device and another device, a change time, a state transition time, a frequency, a period, a starting time, a stopping time, a pause time, a stand-by time, a power-down time, a sleep time, a power-up time, a wake-up time, an alarm time, an alert time, a notification time, a scheduled time, a planned time, a time table, a control time, a signaling time, a request time, an enquiry time, an acknowledgement time, a response time, an event time, a triggering time, a condition/situation to at least one of: change, remain unchanged, enter a state, change state, remain in a state, start, stop, pause, stand by, detect a event, respond to an event, trigger, power down, sleep, power up, wake up, alert, alarm, notify, schedule, set up a timed event, and perform another action, a time period, a duration, a period based on the task, a regular period, a high alert period, a low alert period, more than one related timings, and a timing associated with another timing associated with at least one of: another wireless signal, another time series of probe signal, and another TSCI.

Clause 51. The method of the qualified wireless system of clause 43, further comprising: signaling between at least two of: the Type 1 device, the Type 2 device, and another device, a timing of at least one of: the series of probe signals, the TSCI, the task, and a user requirement of the task.

Clause 52. The method of the qualified wireless system of clause 43, further comprising: signaling an information of at least one of: the series of probe signals, the TSCI, the task, and a user requirement of the task, between at least two of: the Type 1 device, the Type 2 device, and another device.

Clause 53. The method of the qualified wireless system of clause 47, further comprising: signaling an information of at least one of: the series of probe signals, the TSCI, the task, and a user requirement of the task, between the Type 1 device and the Type 2 device using the wireless signal.

Clause 54. The method of the qualified wireless system of clause 43, further comprising: signaling a requirement of at least one of: the series of probe signals, the TSCI, the task, and a user requirement of the task, between at least two of: the Type 1 device, the Type 2 device, and another device.

Clause 55. The method of the qualified wireless system of clause 49, further comprising: signaling a capability in relation to the requirement of at least one of: the series of probe signals, the TSCI, the task, and a user requirement of the task, between at least two of: the Type 1 device, the Type 2 device, and another device.

Clause 56. The method of the qualified wireless system of clause 43, further comprising: negotiating a timing of at least one of: the series of probe signals, the TSCI, the task, and a user requirement of the task, between at least two of: the Type 1 device, the Type 2 device, and another device.

Clause 57. The method of the qualified wireless system of clause 43, further comprising: coordinating a timing of at least one of: the series of probe signals, the TSCI, the task, and a user requirement of the task, between at least two of: the Type 1 device, the Type 2 device, and another device.

Clause 58. The method of the qualified wireless system of clause 43, further comprising: determining a timing of at least one of: the series of probe signals, the TSCI, the task, and a user requirement of the task, between at least two of: the Type 1 device, the Type 2 device, and another device.

Clause 59. The method of the qualified wireless system of clause 43, further comprising: signaling an information regarding a timing of at least one of: the series of probe signals, the TSCI, the task, and a user requirement of the task, between at least two of: the Type 1 device, the Type 2 device, and another device.

Clause 60. The method of the qualified wireless system of clause 43, further comprising signaling a capability regarding a timing of at least one of: the series of probe signals, the TSCI, the task, and a user requirement of the task, between at least two of: the Type 1 device, the Type 2 device, and another device.

Clause 61. The method of the qualified wireless system of clause 43, further comprising: negotiating an information regarding a timing of at least one of: the series of probe signals, the TSCI, the task, and a user requirement of the task, between at least two of: the Type 1 device, the Type 2 device, and another device.

Clause 62. The method of the qualified wireless system of clause 43, further comprising: coordinating an information of a timing of at least one of: the series of probe signals, the TSCI, the task, and a user requirement of the task, between at least two of: the Type 1 device, the Type 2 device, and another device.

Clause 63. The method of the qualified wireless system of clause 43, further comprising: determining an information of a timing of at least one of: the series of probe signals, the TSCI, the task, and a user requirement of the task, between at least two of: the Type 1 device, the Type 2 device, and another device.

Clause 64. The method of the qualified wireless system of clause 43, further comprising: computing a statistics associated with at least one of: the series of probe signals, the TSCI obtained based on the series of probe signals, the task performed based on the TSCI, and a user requirement of the task; wherein the statistics comprises at least one of: a frequency, a rate, a sounding rate, a sounding rate associated with the task, a period, a period associated with the task, an accuracy, a regularity, a consistency, an irregularity, a deviation, an error, a hit rate, a miss rate, a detection, a false alarm, a false positive, a mean, a variance, a high order statistics, a timing accuracy, a timing regularity, a frequency accuracy, a frequency regularity, a timing irregularity, a frequency irregularity, a deviation, a frequency deviation, a timing deviation, a performance, a performance measure, a performance statistics, a time window, a current statistics associated with a current time window, a current frequency, a current rate, and a current period.

Clause 65. The method of the qualified wireless system of clause 59, further comprising: signaling the statistics between at least two of: the Type 1 device, the Type 2 device, and another device.

Clause 66. The method of the qualified wireless system of clause 59, further comprising: negotiating the statistics between at least two of: the Type 1 device, the Type 2 device, and another device.

Clause 67. The method of the qualified wireless system of clause 59, further comprising: negotiating settings of at least one of: the Type 1 device, the Type 2 device, and another device, to achieve a requirement related to at least one of: the statistics, the task and a user requirement of the task.

Clause 68. The method of the qualified wireless system of clause 59, further comprising: coordinating at least two of: the Type 1 device, the Type 2 device, and another device, to achieve a performance related to at least one of: the statistics, the task and a user requirement of the task.

Clause 69. The method of the qualified wireless system of clause 59, further comprising: determining the statistics between at least two of: the Type 1 device, the Type 2 device and another device.

Clause 70. The method of the qualified wireless system of clause 1: checking whether the TSCI is suitable for the task.

Clause 71. The method of the qualified wireless system of clause 65, further comprising: wherein the wireless signal comprises a series of probe signals, obtaining an information of at least one of: the series of probe signals, and the TSCI.

Clause 72. The method of the qualified wireless system of clause 1: wherein the information to comprise at least one of: at least one of: an attribute, a size, a dimension, a cardinality, an amount of components, and a count of components of a CI, associated with at least one of: the TSCI, and a CI of the TSCI, at least one of: a characteristics, a property, a feature, a function, a data type, a precision level, a data structure, an amplitude, a phase, and a power, associated with at least one of: the TSCI, a CI of the TSCI, and a component of the CI, at least one of: a time stamp, a timing, a time duration, a sounding rate, a sounding period, a sounding timing, a regularity, an accuracy, a consistency, an irregularity, a timing jitter, a variation, a deviation, an error, a channel condition, a noise power, an interference, and another channel information associated with at least one of: the TSCI, a CI of the TSCI, a component of the CI, the wireless signal, a probe signal of the wireless signal, the wireless multipath channel, the Type 1 device and the Type 2 device, at least one of: an amount of transmit antenna, a type of transmit antenna, an information of transmit antenna, an antenna gain, a group of at least one transmit antenna, an information of transmit radio, a hardware, a processor, a hardware accelerator, a memory, a sensor, a module, a software, an operating system, an application software, a firmware, a version of a set of instructions, an update history of the set of instructions, a connectivity, a network neighborhood, a capability, an available computing power, a memory bandwidth, a data transfer capability, a storage capacity, a wake-up timing, an operating condition, a setting, a standard compliance, a battery level, a power setting, a system setting, and a location of the Type 1 device, at least one of: an amount of receive antenna, a type of receive antenna, an information of receive antenna, an antenna gain, a group of at least one receive antenna, an information of receive radio, a hardware, a processor, a hardware accelerator, a memory, a sensor, a module, a software, an operating system, an application software, a firmware, a version of a set of instructions, an update history of the set of instructions, a connectivity, a network neighborhood, a capability, an available computing power, a memory bandwidth, a data transfer capability, a storage capacity, a wake-up timing, an operating condition, a setting, a battery level, a power setting, a system setting, and a location of the Type 2 device, at least one of: an amount of transmit antenna, an amount of receive antenna, a type of transmit antenna, a type of receive antenna, a group of at least one transmit antenna, a group of at least one receiver antenna, a processor, a memory, a software, a firmware, a version of a set of instructions, a update history of the set of instructions, a connectivity, a network neighborhood, a capability, and a location, of a wireless relaying device associated with at least one of: the TSCI, a CI of the TSCI, a component of the CI, the wireless signal, the wireless multipath channel, and the Type 1 device, wherein the wireless signal is relayed by the wireless relaying device during the transmission from the Type 1 device to the Type 2 device, a noise condition associated with at least one of: the TSCI, a CI of the TSCI, a component of the CI, the wireless multipath channel, the Type 1 device and the Type 2 device, a signal-to-noise condition associated with at least one of: the TSCI, a CI of the TSCI, a component of the CI, the wireless signal, the wireless multipath channel, the Type 1 device and the Type 2 device, a bandwidth associated with at least one of: the TSCI, a CI of the TSCI, a component of the CI, the wireless signal, the wireless multipath channel, the Type 1 device and the Type 2 device, an effective bandwidth associated with at least one of: the TSCI, a CI of the TSCI, a component of the CI, the wireless signal, the wireless multipath channel, the Type 1 device and the Type 2 device, a quantity associated with at least one of: the TSCI, and a CI of the TSCI, a type associated with at least one of: the TSCI, and a CI of the TSCI, and another information.

Clause 73. The method of the qualified wireless system of clause 1: obtaining the TSCI or an information of the TSCI based on at least one of: a primitive, a service primitive, a PHY layer primitive, a MAC layer primitive, an instructive command, a set of configurations, a set of instructions, a firmware, a firmware driver, a firmware call, a software, a software driver, a software call, an operating system (OS), an OS driver, an OS call, a system call, a firmware interface, a function call, a software interface, at least one of: a parameter, a data field, an input data and an output data of one of the above, a collection of at least one of: primitives, instructive commands, configurations, instructions, firmware, software, firmware drivers, software drivers, and OS drivers, any of the above that provide/perform/achieve low-level control of at least one of: a device, a hardware of the device, and an IC of the device, any of the above of at least one of: the Type 1 device, the IC of the Type 1 device, the Type 2 device, the IC of the Type 2 device, another device and an IC of the another device, a format of the TSCI or the information of the TSCI, a representation of the TSCI or the information of the TSCI, a compression scheme for the TSCI or the information of the TSCI, an encryption scheme for the TSCI or the information of the TSCI, a file format or storage scheme of the TSCI or the information of the TSCI, a transmission format/scheme, or streaming format/scheme of the TSCI or the information of the TSCI, a requirement based on the task comprising: a CI precision requirement, a CI time stamp requirement, a timing requirement of the TSCI or the wireless signal, a timing accuracy requirement of the TSCI or the wireless signal, a timing regularity of the TSCI or the wireless signal, a sounding rate of the TSCI or the wireless signal, an transmit antenna and receive antenna requirement, a bandwidth associated with the TSCI or the wireless signal, an effective bandwidth associated with the TSCI or the wireless signal, a quantity of SCI, the qualification criterion, a qualification of at least one of: the TSCI, the Type 1 device, the IC of the Type 1 device, the Type 2 device, the IC of the Type 2 device, and another requirement.

Clause 74. The method of the qualified wireless system of clause 1: comparing a characteristics of the TSCI with a requirement of the task.

Clause 75. The method of the qualified wireless system of clause 1: making a request for the TSCI based on the task.

Clause 76. The method of the qualified wireless system of clause 1: making a request for the TSCI for the task.

Clause 77. The method of the qualified wireless system of clause 7: making a request for the TSCI with a requirement. (precision, timing, sounding rate, Perform task jointly.

Clause 78. The method of the qualified wireless system of clause 12: making a request for the particular TSCI in a particular representation.

Clause 79. The method of the qualified wireless system of clause 12: making a request for the particular TSCI with a particular precision.

Clause 80. The method of the qualified wireless system of clause 1: wherein there are a plurality of pairs of Type 1 device and Type 2 device in the venue, each respective Type 2 device receiving a respective wireless signal asynchronously from the respective Type 1 device and obtaining asynchronously a respective TSCI; wherein more than one pairs share a common Type 2 device.

Clause 81. The method of the qualified wireless system of clause 6: wherein the common Type 2 device is active alternately in the more than one pairs.

Clause 82. The method of the qualified wireless system of clause 7: wherein the common Type 2 device is active alternately in the same wireless channel in the more than one pairs.

Clause 83. The method of the qualified wireless system of clause 6: wherein the common Type 2 device is active simultaneously or contemporaneously in the more than one pairs.

Clause 84. The method of the qualified wireless system of clause 9: wherein the common Type 2 device is active simultaneously or contemporaneously in the same wireless channel in the more than one pairs.

Clause 85. The method of the qualified wireless system of clause 6, further comprising: making a plurality of TSCI individually available, wherein each respective TSCI is obtained based on a respective wireless signal transmitted from a respective Type 1 device to the common Type 2 device.

Clause 86. The method of the qualified wireless system of clause 6: requesting a particular TSCI, wherein the particular TSCI is obtained based on a particular wireless signal transmitted from a particular Type 1 device to the common Type 2 device.

Clause 87. The method of the qualified wireless system of clause 12: making a request for the particular TSCI.

Clause 88. The method of the qualified wireless system of clause 12: making a request for the particular TSCI with a particular requirement. (precision, timing, sounding rate, etc.

Clause 89. The method of the qualified wireless system of clause 12: making a request for the particular TSCI in a particular representation.

Clause 90. The method of the qualified wireless system of clause 12: making a request for the particular TSCI with a particular precision.

Clause 91. The method of the qualified wireless system of clause 12: making the particular TSCI available based on the request.

Clause 92. The method of the qualified wireless system of clause 12: making a software request for the particular TSCI.

Clause 93. The method of the qualified wireless system of clause 12: buffering the particular TSCI.

Clause 94. The method of the qualified wireless system of clause 6: obtaining the particular TSCI.

Clause 95. The method of the qualified wireless system of clause 6: obtaining the particular TSCI.

Clause 96. The method of the qualified wireless system of clause 6, further comprising: performing a first task based on a first TSCI obtained based on a first wireless signal transmitted from a first Type 1 device to the common Type 2 device; and performing a second task based on a second TSCI obtained based on a second wireless signal transmitted from a second Type 1 device to the common Type 2 device.

Clause 97. The method of the qualified wireless system of clause 6, further comprising: making a plurality of TSCI available, wherein each respective TSCI is obtained based on a respective wireless signal transmitted from a respective Type 1 device to the common Type 2 device.

Clause 98. The method of the qualified wireless system of clause 11, further comprising: making the plurality of TSCI available for a joint task.

Clause 99. The method of the qualified wireless system of clause 11, further comprising: requesting the plurality of TSCI available for a joint task.

Clause 100. The method of the qualified wireless system of clause 11, further comprising: performing the joint task jointly based on the plurality of TSCI.

Clause 101. The method of the qualified wireless system of clause 11, further comprising: performing the joint task jointly based on the plurality of TSCI.

Clause 102. The method of the qualified wireless system of clause 6, further comprising: monitoring a motion of an object in the venue jointly based on all TSCI obtained based on the plurality of pairs, each TSCI obtained separately from a respective pair.

Clause 103. The method of the qualified wireless system of clause 6, further comprising: monitoring a motion of an object in the venue individually each based on a TSCI obtained in one of the more than one pairs, monitoring the motion jointly by combining the individual monitoring.

Clause 104. The method of the qualified wireless system of clause 1: wherein there are a plurality of pairs of Type 1 device and Type 2 device in the venue, each respective Type 2 device receiving a respective wireless signal asynchronously from the respective Type 1 device and obtaining asynchronously a respective TSCI; wherein more than one pairs share a common Type 1 device.

Clause 105. The method of the qualified wireless system of clause 7: wherein the common Type 1 device is active alternately in the more than one pairs.

Clause 106. The method of the qualified wireless system of clause 8: wherein the common Type 1 device is active alternately in the same wireless channel in the more than one pairs.

Active in a simultaneous, concurrent, or contemporaneous manner. Two possibilities: (a) broadcast, (b) multiple probe signals simultaneous transmitted to multiple Type 2 devices (e.g. using MU-MIMO).

Clause 107. The method of the qualified wireless system of clause 7: wherein the common Type 1 device is active simultaneously or contemporaneously in the more than one pairs.

Clause 108. The method of the qualified wireless system of clause 10: wherein the common Type 1 device is active simultaneously or contemporaneously in the same wireless channel in the more than one pairs.

Clause 109. The method of the qualified wireless system of clause 7: wherein the common Type 1 device broadcasts to more than one Type 2 devices in the more than one pairs, transmitting a common wireless signal to all the more than one Type 2 devices.

Clause 110. The method of the qualified wireless system of clause 12: wherein an information of the broadcast is announced.

Clause 111. The method of the qualified wireless system of clause 12: wherein an information of the broadcast is announced in at least one of: a data frame, a control frame, a beacon frame, a beacon frame in a primary channel, a probe request frame, a probe response frame, an acknowledgement frame, a multicast frame, a broadcast frame, a frame with a header, a FHSS frame, a DSSS frame, an OFDM frame, a HR-DSSS frame, an ERP-OFDM frame, a DSSS-OFDM frame, an ERP-PBCC frame, an HT-OFDM frame, a VHT-OFDM frame, a HE-OFDM frame, a DMG frame, an EDMG frame, a TVHT frame, an SIG frame, a WUR frame, an IR frame, another frame, a server, a cloud server, a local server, a web server, a database, a publicly accessible site, a published site, an announcement channel, a handshake channel, an enquiry channel, a signaling channel, a primary channel, a secondary channel, a side channel, an announcement, a handshake, an enquiry, a signaling, the wireless signal, a past wireless signal, and another channel.

Clause 112. The method of the qualified wireless system of clause 12: wherein the common Type 1 device broadcasts to more than one Type 2 devices in the more than one pairs; wherein the common Type 1 device transmits the common wireless signal to a common destination address; wherein each of the more than one Type 2 devices sets its address as the common destination address to receive the common wireless signal.

Clause 113. The method of the qualified wireless system of clause 15: wherein at least one of: the common destination address, and an information of broadcasting channel associated with the common wireless signal is announced.

Clause 114. The method of the qualified wireless system of clause 12: wherein the common Type 1 device broadcasts to more than one Type 2 devices in the more than one pairs; wherein the common Type 1 device transmits the common wireless signal to a universal destination address; wherein each of the more than one Type 2 devices is configured to respond to the universal destination address and receive the common wireless signal.

Clause 115. The method of the qualified wireless system of clause 12: wherein the common Type 1 device broadcasts to more than one Type 2 devices in the more than one pairs; wherein the common Type 1 device transmits a common wireless signal; wherein each of the more than one Type 2 devices is configured to respond and receive the common wireless signal.

Clause 116. The method of the qualified wireless system of clause 1: wherein an information of the transmitting of the wireless signal from the Type 1 device through the wireless channel is announced, at least in part, in at least one of: a data frame, a control frame, a beacon frame, a beacon frame in a primary channel, a probe request frame, a probe response frame, a multicast frame, a broadcast frame, a frame with a header, a FHSS frame, a DSSS frame, an OFDM frame, a HR-DSSS frame, an ERP-OFDM frame, a DSSS-OFDM frame, an ERP-PBCC frame, an HT-OFDM frame, a VHT-OFDM frame, a HE-OFDM frame, a DMG frame, an EDMG frame, a TVHT frame, an SIG frame, a WUR frame, an IR frame, another frame, a server, a cloud server, a local server, a web server, a database, a publicly accessible site, a published site, an announcement channel, a handshake channel, an enquiry channel, a signaling channel, a primary channel, a secondary channel, a side channel, an announcement, a handshake, an enquiry, a signaling, the wireless signal, a past wireless signal, and another channel.

Clause 117. The method of the qualified wireless system of clause 1, further comprising: exchanging an information between the Type 1 device and the Type 2 device.

Clause 118. The method of the qualified wireless system of clause 20, further comprising: exchanging the information between the Type 1 device and the Type 2 device using the wireless multipath channel.

Clause 119. The method of the qualified wireless system of clause 20, further comprising: exchanging the information based on a standardized protocol.

Clause 120. The method of the qualified wireless system of clause 20, further comprising: determining an agreed set of settings between the Type 1 device and the Type 2 device.

Clause 121. The method of the qualified wireless system of clause 23, further comprising: determining the agreed set of settings between the Type 1 device and the Type 2 device for a task.

determine agreed setting to satisfy requirement related to a task.

Clause 122. The method of the qualified wireless system of clause 24, further comprising: determining that the agreed set of settings satisfy a requirement of the task.

Clause 123. The method of the qualified wireless system of clause 24: wherein the task is associated with the venue.

Clause 124. The method of the qualified wireless system of clause 23, further comprising: determining the agreed set of settings between the Type 1 device and the Type 2 device for monitoring a motion in the venue.

Clause 125. The method of the qualified wireless system of clause 27, further comprising: determining that the agreed set of settings satisfy a requirement for monitoring the motion in the venue.

Clause 126. The method of the qualified wireless system of clause 27: wherein the motion is a motion of an object in the venue.

Clause 127. The method of the qualified wireless system of clause 23: wherein the agreed set of settings is a set of settings for the transmission of the wireless signal from the Type 1 device to the Type 2 device.

Clause 128. The method of the qualified wireless system of clause 23: determining the agreed set of settings between the Type 1 device and the Type 2 device based on a standardized protocol.

Clause 129. The method of the qualified wireless system of clause 23, further comprising: transmitting the wireless signal based on the agreed set of settings.

Clause 130. The method of the qualified wireless system of clause 23, further comprising: broadcasting the wireless signal based on the agreed set of settings.

Clause 131. The method of the qualified wireless system of clause 20, further comprising: determining that no settings of the Type 1 device and the Type 2 device can satisfy a requirement of a task.

Clause 132. The method of the qualified wireless system of clause 34: determining based on a standardized protocol.

Clause 133. The method of the qualified wireless system of clause 34: wherein the task is a monitoring task related to the venue.

Clause 134. The method of the qualified wireless system of clause 34, further comprising: wherein the task is to monitor a motion of an object in the venue.

Clause 135. The method of the qualified wireless system of clause 20, further comprising: exchanging the information between the Type 1 device and the Type 2 device before the transmitting of the wireless signal.

Clause 136. The method of the qualified wireless system of clause 20, further comprising: exchanging the information between the Type 1 device and the Type 2 device during the transmitting of the wireless signal.

Clause 137. The method of the qualified wireless system of clause 20, further comprising: exchanging the information between the Type 1 device and the Type 2 device after the transmitting of the wireless signal.

Clause 138. The method of the qualified wireless system of clause 20: wherein the information comprises at least one of: a meta-data, a device information, a manufacturing information, a model information, a version information, a registration information, an identification information, a classification, a category, a grouping, a restriction, a usage information, a service provider information, a service information, a sales information, a logistical information, a system information, a companion system information, a capability information, a power information, a computation information, a processor information, a storage information, a supported system information, a supported task information, a performance requirement, a carrier frequency, a frequency information, a timing information, an antenna information, a location-based information, a software or firmware information, an updating information, a hardware information, a component information, a network information, a wireless network information, an address information, an access information, a security protection information, an encryption information, an internet information, and another information, of the Type 1 device, the Type 2 device or a device communicatively coupled with the Type 1 device or the Type 2 device.

Clause 139. The method of the qualified wireless system of clause 20, further comprising: exchanging a portion of the information using at least one of: a data stream, a point-topoint stream, a multicast stream, a broadcast stream, a file, a header of a file, a field of a file, a name of a file, a meta-data of a file, a directory of a file, a file based on a standardized format, a database, a database of a storage network, a data network, a database of a server, a database of a cloud server, a database of a local server, a data packet, a data record, a data structure, a data structure based on a standard, a field of a database, a field of a data record, a field of a data structure, a field of a data packet, a server, a cloud server, a local server, a web server, a database, a publicly accessible site, a published site, a frame, a frame of a data stream, a frame of a file, a preamble of a frame, a header of a frame, a payload of a frame, a flag of a frame, a field of a frame, a field of a preamble, a field of a header, a control field, a signaling field, a protocol field, a data field, a payload field, a signal field, a service field, a timing field, a duration field, an extension field, a trailer field, a data frame, a control frame, a beacon frame, a beacon frame in a primary channel, a beacon frame in a secondary channel, a probe request frame, a probe response frame, a multicast frame, a broadcast frame, a frame with a header, an enquiry frame, a response frame, an acknowledgement frame, a FHSS frame, a DSSS frame, an OFDM frame, a HR-DSSS frame, an ERP-OFDM frame, a DSSS-OFDM frame, an ERP-PBCC frame, an HT-OFDM frame, a VHT-OFDM frame, a HE-OFDM frame, a DMG frame, an EDMG frame, a TVHT frame, an SIG frame, a WUR frame, an IR frame, another frame, one or more radio frequency (RI) band with a bandwidth of B MHz where B is between 0.01 and 100000, a data rate less than or equal to the rate at which the wireless signal is being transmitted from the Type 1 device to the Type 2 device, a short preamble of a frame, a long preamble of a frame, a preamble sent at a data rate of A Mbps where A is between 0.01 and 100000, a preamble sent at a lowest supported rate in a physical layer of the wireless multipath channel, a frame or protocol compliant to at least one of: a wireless protocol, a wireless network standard, a wireless mess network standard, a wireless communication standard, WiFi, WiMax, WiGiG, WLAN, WMAN, an IEEE 802 standard, an IEEE 802.11 standard, an IEEE 802.15 standard, an 802.16 standard, a mobile communication standard, a cellular communication standard, a mobile network standard, a 3GPP standard, GSM, EDGE, WCDMA, LTE, a 2G/3G/4G/5G/6G/7G/8G related standard/system/protocol, a standard or a protocol comprising at least one of: time-division multiple access (TDMA), frequency-division multiple access (FDMA), code-division multiple access (CDMA), orthogonal frequency-division multiplexing (OFDM), multiple-input-multiple-output (MIMO), carrier aggregation (CA), orthogonal frequency-division multiple access (OFDMA), multi-user MIMO (MU-MIMO), beamforming (BF), transmit beamforming (TxBF), receiver beamforming (RxBF), target wake time (TWT), spatial streams (SS), BSS coloring, quadrature amplitude modulation (QAM), fast Fourier transform (FFT), the channel information (CI), channel state information (CSI), CSI associated with a transmitting antenna and a receiving antenna, channel impulse response (CIR), channel frequency response (CFR), compressed CSI, and uncompressed CSI, a wireless communication protocol that computes CSI of the wireless multipath channel, a defacto standard, an industry standard, a national standard, an international standard, a Bluetooth standard, BLE, a UWB standard, NFC, ZigBee, and another standard, an announcement channel, an announcement channel, a handshake, a handshake channel, an enquiry, an enquiry channel, a signaling, a signaling channel, a primary channel, a secondary channel, a side channel, the wireless signal, a signal exchange before the wireless signal is transmitted, a signal exchange between the Type 1 device and the Type 2 device, a signal exchange between the Type 1 device and a server, a signal exchange between the Type 2 device and a server, and another avenue.

Clause 140. The method of the qualified wireless system of clause 20, further comprising: transmitting the wireless signal based on the exchanged information.

Signal transmission based on agreed set of settings.

Clause 141. The method of the qualified wireless system of clause 20, further comprising: broadcasting the wireless signal based on the exchanged information.

A device functions as both Type 1 and Type 1.

Clause 142. The method of the qualified wireless system of clause 1: wherein there are a plurality of pairs of Type 1 device and Type 2 device in the venue, each respective Type 2 device receiving a respective wireless signal asynchronously from the respective Type 1 device and obtaining asynchronously a respective TSCI; wherein a device functions as a Type 1 device in a first pair and as a Type 2 device in a second pair.

Each computed CI may be an estimation of the real CI. Estimation requirement: e.g. estimation error of CI, minimum average absolute error, minimum average square error, minimum maximum error, minimum average log error, minimum weighted error, minimum trimmed error, etc. Precision requirement: e.g. 8 bit precision, 12 bit, 16 bit, 20 bit, 24 bit, 32 bit, etc. Representation requirement: e.g. fixed point, floating point, single precision, double precision, extended precision, rounding, truncation, two's complement, one's complement, sign-and-magnitude, compression, etc. Encoding: e.g. compression, redundancy reduction, real-time requirement: e.g. time lag of less than 1 sec, 0.1 s, 0.01 s, 0.001 s, 0.0001 s, 0,00001, etc. buffering: e.g. storaging requirement of 1 byte, 10 byte, 100 byte, 1 kB, 10 kB, 1 MB, 1 GB, etc. memory requirement: e.g. memory read time, memory write time, cache, data bus width. RAM, ROM, refreshing, DRAM, SDRAM, etc. stability/temporal consistency/correlation/outlier/deviation/tail/percentile/quantile requirement: e.g. when there is little/no change in venue, the TSCI needs to be insensitive to noise/background radiation/atmospheric/climate condition/computation imperfection/algorithmic tradeoff, or be stable over time, or consistent over time, or not fluctuate much over time, or has high or low correlation over time, or have very few outliers over time, or have little deviation over time, or have little/small statistical tail, or bounded percentile, or bounded quantile, etc. indicator requirement: the IC firmware may have an interface (e.g. a driver, a tool in a firmware or SDK or software package) that would allow an application software to.

Clause 143. The method of the qualified wireless system of clause 1, further comprising: receiving the wireless signal based on the IC of the Type 2 device, computing the TSCI based on the IC, obtaining the TSCI from the IC, wherein the qualification criterion for the qualification of the IC of the Type 2 device comprises at least one of: an estimation error requirement of each CI, an estimation error requirement of the TSCI, a precision requirement of each CI, a precision requirement of the TSCI, a representation requirement of the TSCI, an encoding requirement of the TSCI, a real-time requirement of the TSCI, a buffering requirement of the TSCI, a memory requirement of the TSCI, a stability requirement of the TSCI, a temporal consistency requirement of the TSCI, a correlation requirement of the TSCI, an outlier requirement of the TSCI, a deviation requirement of the TSCI, a tail requirement of the TSCI, a percentile requirement of the TSCI, a quantile requirement of the TSCI, a scalability requirement of the TSCI, a indicator to communicate the availability of at least one of: a CI, a group of recent CI, and the whole TSCI, an accuracy requirement of the computation of more than one consecutive CI, making the TSCI available to another set of instructions stored in another memory; wherein the another set of instructions when executed causes another processor to: monitoring a motion of an object in the venue.

Clause 144. The method of the qualified wireless system of clause 1, further comprising: wherein the wireless signal comprises a time series of probe signal (TSPS), wherein a field of a control signal indicates at least one of: a parameter, a destination address, a frequency, a timing, an allowable frequency and an allowable period, of the TSPS.

Clause 145. The method of the qualified wireless system of clause 18, further comprising: wherein the control signal is transmitted by at least one of: the Type 1 device and another device.

Clause 146. The method of the qualified wireless system of clause 19, further comprising: wherein the control signal is transmitted in at least one of: a regular manner, a repeated manner, an occasional manner, an on-demand manner, an acknowledgement-to-query manner, and a broadcasting manner.

Clause 147. The method of the qualified wireless system of clause 1, further comprising: coordinating the Type 1 device and the Type 2 device. Signaling between the Type 1 device and the Type 2 device.

Clause 148. The method of the qualified wireless system of clause 1, further comprising: signaling between the Type 1 device and the Type 2 device, Sending signal from the Type 1 device to the Type 2 device.

Clause 149. The method of the qualified wireless system of clause 1, further comprising: wherein the wireless signal comprises at least one probe signal, wherein the probe signal comprises a frame with at least one of: a preamble field, a header field, a data field, a data frame, a MAC frame, a synchronization field, a training field, a delimiter field, a header field, a signal field, a service field, a length field, an error-control field, and another field, sending the at least one probe signal from the Type 1 device to the Type 2 device.

In WiFi/LTE/3G/4G/5G/6G or any wireless network, a physical layer packet is sent from Type 1 device to Type 2 device.

Clause 150. The method of the qualified wireless system of clause 1, further comprising: sending a physical layer packet from the Type 1 device to the Type 2 device, wherein the physical layer frame to comprise at least one of: a preamble transmitted in a first modulation at a first data rate, a header transmitted in a second modulation at a second data rate, and a physical layer payload in a third modulation at a third data rate.

Clause 151. The method of the qualified wireless system of clause 6: wherein at least one of: the preamble, the header and the physical layer payload, contains a field related to wireless sensing.

Clause 152. The method of the qualified wireless system of clause 6: wherein at least one of: the preamble, the header and the physical layer payload, contains a field related to sensing of the venue based on the TSCI.

Clause 153. The method of the qualified wireless system of clause 6: wherein at least one of: the preamble, the header and the physical layer payload, contains a field related to the monitoring of an object motion in the venue based on the TSCI.

Clause 154. The method of the qualified wireless system of clause 5, further comprising: causing the Type 2 device to at least one of: make the TSCI available, signal that the TSCI is available, processed the TSCI, make the processed TSCI available, signal that the processed TSCI is available, compute an analytics based on the TSCI, make the analytics available, signal that the analytics is available, perform a task based on the analytics, perform a task jointly with at least one of: another Type 1 device and another Type 2 device, and another operation.

Clause 155. The method of the qualified wireless system of clause 1, further comprising signaling at least one of: the Type 1 device and the Type 2 device.

Coordinating.

Clause 156. The method of the qualified wireless system of clause 1, further comprising: communicating at least one of: a request, a command, a response, a reply and a signal to at least one of: the Type 1 device and the Type 2 device.

Clause 157. The method of the qualified wireless system of clause 1, further comprising: causing the Type 1 device to transmit the wireless signal to the Type 2 device.

Clause 158. The method of the qualified wireless system of clause 4, further comprising: causing the Type 1 device to transmit the wireless signal to the Type 2 device in such a way that the TSCI satisfies the respective qualification criterion.

Clause 159. The method of the qualified wireless system of clause 1, further comprising: causing the Type 2 device to receive the wireless signal from the Type 1 device.

Clause 160. The method of the qualified wireless system of clause 6, further comprising: causing the Type 2 device to obtain the TSCI based on the wireless signal.

Clause 161. The method of the qualified wireless system of clause 7, further comprising: causing the Type 2 device to monitor a motion of an object in the venue based on the TSCI, wherein the wireless multipath channel is impacted by the motion of the object in the venue.

Clause 162. The method of the qualified wireless system of clause 7, further comprising: requesting the Type 2 device to compute a characteristics of the motion of the object based on the TSCI.

Clause 163. The method of the qualified wireless system of clause 9, further comprising requesting the Type 2 device to perform a task based on the characteristics of the motion of the object computed based on the TSCI.

Clause 164. The method of the qualified wireless system of clause 1, further comprising: conducting a negotiation between the Type 1 device and the Type 2 device.

Clause 165. The method of the qualified wireless system of clause 1: wherein the qualification criterion is applied at a time when the venue has no change and no object motion.

To test for qualification, there may be requirements on the venue (e.g. in clause 2), and other requirements. There may be a requirement of carrier frequency of the wireless multipath channel. For example, 2.4 GHz or 5 GHz for WiFi Let N1 be the number of antennas of the Type 1 device. Let N2 be the number of antenna of the Type 2 device. There may be a requirement regarding N1 and N2. E.g. If the channel bandwidth is 20 MHz, the product of N1 and N2 (i.e. N1*N2) may be required to be 4 or more. E.g. If the channel bandwidth is 40 MHz, N1*N2 may be required to be 2, or 3, or more. E.g. If the channel bandwidth is 80 MHz (e.g. 802.11n/ac) or 160 MHz (e.g. 802.11ac), N1*N2 may be required to be 1 or more. Thresholds used in the qualification criterion may be determined/changed/adjusted based on the channel bandwidth, N1, N2, a description of the venue, etc.

Clause 166. The method of the qualified wireless system of clause 1: wherein the respective qualification criterion comprises at least one of: a requirement of the venue, a requirement of the wireless multipath channel, a requirement of the wireless signal, a requirement of signaling between the Type 1 device and the Type 2 device, a requirement of the Type 1 device, a requirement of the Type 2 device, a requirement of the wireless transmitter of the Type 1 device, a requirement of the wireless receiver of the Type 2 device, a requirement of the antennas of the Type 1 device, a requirement of the antennas of the Type 2 device, a requirement of the number of antennas of the Type 1 device, a requirement of the number of antennas of the Type 2 device, a requirement of the placement of the Type 1 device, a requirement of the placement of the Type 2 device, a requirement of the module of the Type 1 device, a requirement of the module of the Type 2 device, a requirement of the IC of the Type 1 device, a requirement of the IC of the Type 2 device, and a type of qualification.

Clause 167. The method of the qualified wireless system of clause 3: wherein the requirement of the venue comprises at least one of: a type-of-venue requirement comprising at least one of: indoor, outdoor, semi-outdoor, underground, house, office, building, warehouse, lab, special testing facility, and another venue type, a type-of-partition requirement comprising at least one of: wall plaster, dry wall, fiberboard, paneling, gypsum, wood, metal, vinyl, stucco, shingle, asphalt, brick, stone, masonry, concrete, cement, tile, ceramic tile, glass, and another partition type, a size-of-venue requirement comprising at least one of: volume, area, width, length, height, depth, thickness, layering, and another venue size, a structure requirement comprising at least one of: furniture, supporting structures, columns, beams, tables, chairs, shelves, cabinets, vehicles, and another structure, a multipath-richness requirement of the venue, a state requirement of the venue, a motion requirement of the venue, a composition requirement of the venue, the venue is not changing at least temporarily, the venue is stationary at least temporarily, the venue is motionless at least temporarily, there is no object moving in the venue at least temporarily, and another venue-related requirement.

Clause 168. The method of the qualified wireless system of clause 3: wherein the requirement of the wireless multipath channel comprises at least one of: a bandwidth requirement comprising of at least one of: 10 MHz, 20 MHz, 30 MHz, 40 MHz, 50 MHz, 60 MHz, 70 MHz, 80 MHz, 100 MHz, 160 MHz, 320 MHz, and another bandwidth, a carrier frequency requirement based on at least one of: an ISM band centered near at least one of: 6.78 MHz, 13.56 MHz, 27.12 MHz, 40.68 MHz, 4.5 GHz, 33.93 MHz, 915 MHz, 2.45 GHz, 5 GHz, 5.8 GHz, 24.125 GHz, 61.25 GHz, 122.5 GHz, and 245 GHz, a mobile communication band, a mobile communication channel, 3G, 4G, LTE, 5G, 6G, 7G, a WiFi band, a WiFi channel, and another carrier frequency, a standard compliance requirement comprising at least one of: WLAN, WiFi, a 802.11 standard, a 802.15 standard, a 802.20 standard, a mobile communication standard, a 3GPP standard, 3G, 4G, LTE, 5G, 6G, 7G, 8G, a Bluetooth standard, a standard using OFDM, a standard comprising computation of the CI, and another standard, a protocol requirement, a network requirement, a signaling requirement, a signal handshaking requirement, a multiple access requirement, a channel traffic requirement, a channel availability requirement, a frequency hopping requirement, a data transmission requirement, and another channel-related requirement.

Clause 169. The method of the qualified wireless system of clause 3: wherein the requirement of the wireless signal comprises at least one of: the wireless signal comprising a time series of probe signals (TSPS), a protocol requirement, a network requirement, a signaling requirement, a signal handshaking requirement, a multiple access requirement, a channel traffic requirement, a modulation requirement, a frequency hopping requirement, a data transmission requirement, a transmission power requirement of the TSPS, a probing frequency requirement of the TSPS, a probing timing requirement of the TSPS, a sounding frequency requirement of the TSPS, a sounding timing requirement of the TSPS, a timing requirement of the TSPS, a rapid-firing timing requirement of the TSPS, a pulsating timing requirement of the TSPS, a progressive timing requirement of the TSPS, a time-varying timing requirement of the TSPS, a timing jitter requirement of the TSPS, a broadcasting requirement associated with each probe signal, a signaling requirement associated with each probe signal, a protocol requirement associated with each probe signal, a handshake requirement associated with each probe signal, a requirement of a predecessor signal that triggers the Type 1 device to send a probe signal, a requirement of a predecessor signal to which a probe signal is an acknowledgement in a handshake, a requirement of a predecessor signal to which a probe signal is a reply in a handshake, a data field requirement of a probe signal that causes the obtaining of CI by the Type 2 device, a header field requirement of a probe signal that causes the obtaining of CI by the Type 2 device, a data field requirement of a packet of a probe signal that causes the obtaining of CI by the Type 2 device, a control data field requirement of a probe signal that causes the obtaining of CI by the Type 2 device, and another signal-related requirement.

Clause 170. The method of the qualified wireless system of clause 3: wherein the requirement of the Type 1 device comprises at least one of: a placement requirement, an installation requirement, a processor requirement, a memory requirement, a software requirement, a system requirement, a power requirement, an interface requirement, a transmission requirement, a housing requirement, a signaling requirement, an environment requirement, an antenna-type requirement, an antenna-count requirement, an antenna-gain requirement, an antenna-placement requirement, an antenna-radiation requirement, an antenna-material requirement, an antenna-structure requirement, and another Type 1 device requirement.

Clause 171. The method of the qualified wireless system of clause 3: wherein the requirement of the Type 2 device comprises at least one of: a placement requirement, an installation requirement, a processor requirement, a memory requirement, a software requirement, a system requirement, a power requirement, an interface requirement, a transmission requirement, a housing requirement, a signaling requirement, an environment requirement, an antenna-type requirement, an antenna-count requirement, an antenna-gain requirement, an antenna-placement requirement, an antenna-radiation requirement, an antenna-material requirement, an antenna-structure requirement, and another Type 2 device requirement.

Consider two CI. Qualification criterion: (TRRS high enough, stationary/stable) First CI and second CI are similar (e.g. small TRRS between them). Or, >First CI and predictor of first CI based on second CI are similar. The predictor may be zero-order hold, i.e. the predictor may be the second CI. It may be first order (e.g. linear) predictor based on two past CI. It may also be second order (based on 3 past CI) or higher order predictor or other predictors. Or, First time and second time are close to each other.

Clause 172. The method of the qualified wireless system of clause 1: wherein a first CI of the TSCI is obtained by the Type 2 device at a first time; wherein a second CI of the TSCI is obtained by the Type 2 device at a second time; wherein the qualification criterion comprises at least one of: >First CI and second CI are similar (described in different wordings) the first CI and the second CI are similar, there is little variation between the first CI and the second. CI, the first CI is in a neighborhood of the second CI, a similarity score between the first CI and the second CI is greater than a threshold, a variation score between the first CI and the second CI is less than a threshold, a distance score between the first CI and the second CI is less than a threshold, First CI and predictor of first CI based on second CI are similar Predictor may be second CI, or linear predictor, or 2nd order predictor, or higher order predictor, or another predictor the first CI and a predictor of the first CI based on the second CI are similar, there is little variation between the first CI and the predictor, the first CI is in a neighborhood of the predictor, a similarity score between the first CI and the predictor is greater than a threshold, a variation score between the first CI and the predictor is less than a threshold, a distance score between the first CI and the predictor is less than a threshold, >Feature of first CI and corresponding feature of second CI are similar. The feature may comprise at least one of: a magnitude, a phase, a magnitude square, a subcarrier, a subcarrier magnitude, a subcarrier phase, a tab, a component, a component magnitude, a component phase, a time-domain component, a frequency-domain component, a subset, an average, a weighted average, a trimmed mean, a percentile, a function (e.g. absolute, square, polynomial, root, square root, cubic root, exponential, trigonometric, log, etc) of another features, etc. A feature of the first CI and the feature of the second CI are similar, the feature of the first CI is in a neighborhood of the feature of the second. CI, a similarity score between the feature of the first CI and the feature of the second CI is greater than a threshold, a variation score between the feature of the first CI and the feature of the second CI is less than a threshold, a distance score between the feature of the first CI and the feature of the second CI is less than a threshold, >Feature of first CI and corresponding feature of predictor CI of first CI are similar.

The feature of the first CI and the feature of the predictor of the first CI based on the second CI are similar, the feature of the first CI is in a neighborhood of the feature of the predictor, a similarity score between the feature of the first CI and the feature of the predictor is greater than a threshold, a variation score between the feature of the first CI and the feature of the predictor is less than a threshold, a distance score between the feature of the first CI and the feature of the predictor is less than a threshold, First time and second time are close to each other. The first time and the second time are similar, the first time is in a neighborhood of the second time, the first CI and the second CI are neighboring CI in the TSCI, the first time and the second time are neighboring sampling time of the Type 2 device, a difference between the first time and the second time is less than a threshold, and another qualification criterion.

Clause 173. The method of the qualified wireless system of clause 1: wherein the wireless signal comprises a time series of probe signals (TSPS); wherein a first probe signal transmitted by the Type 1 device at a first transmitting time is associated with a first CI of the TSCI obtained by the Type 2 device at a first time; wherein a second probe signal transmitted by the Type 1 device at a second transmitting time is associated with a second CI of the TSCI obtained by the Type 2 device at a second time; wherein the qualification criterion comprises at least one of: >First and second transmitting time are close to each other/similar (described in different wordings) the first transmitting time and the second transmitting time are similar, there is little variation between the first transmitting time and the second transmitting time, the first transmitting time is in a neighborhood of the second transmitting time, a first probe signal and the second probe signal are neighboring probe signals in the time series of probe signal, the first transmitting time and the second transmitting time are neighboring transmitting time of the Type 1 device, a difference between the first transmitting time and the second transmitting time is less than a threshold, >First and second transmitting time, or first and second time are close to each other/similar (described in different wordings) two of the first transmitting time, the first time, the second transmitting time and the second time are similar, there is little variation between the two times, the two times are in a neighborhood of each other, a difference between the two times is less than a threshold, and another qualification criterion.

Clause 174. The method of the qualified wireless system of clause 1: wherein there are a plurality of CI of the TSCI in a period of time; wherein the qualification criterion comprises at least one of: >The plurality of CI are similar (described in different wordings) the plurality of CI are similar, the plurality of CI are consistent, there is little variation among the plurality of CI, there is little outlier among the plurality of CI, all of the plurality of CI are in a neighborhood, all of the plurality of CI are in a dense cluster, a similarity score of the plurality of CI is greater than a threshold, a variation score of the plurality of CI is less than a threshold, a distance score of the plurality of CI is less than a threshold, majority vote a similarity score of the plurality of CI is greater than a threshold for at least a percentage of the period of time, a variation score of the plurality of CI is less than a threshold for at least a percentage of the period of time, a distance score of the plurality of CI is less than a threshold for at least a percentage of the period of time, a similarity score of the plurality of CI is less than a threshold for at most a percentage of the period of time, a variation score of the plurality of CI is greater than a threshold for at most a percentage of the period of time, a distance score of the plurality of CI is greater than a threshold for at most a percentage of the period of time, some possible similarity score based on pairwise similarity score a mean of a pairwise similarity score of the plurality of CI is greater than a threshold, a median of the pairwise similarity score of the plurality of CI is greater than a threshold, a mode of the pairwise similarity score of the plurality of CI is greater than a threshold, a percentile of the pairwise similarity score of the plurality of CI is greater than a threshold, a smallest pairwise similarity score of the plurality of CI is greater than a threshold, a weighted mean of the pairwise similarity score of the plurality of CI is greater than a threshold, a variance of the pairwise similarity score of the plurality of CI is less than a threshold, some possible similarity score based on pairwise similarity score with respect to centroid (mean) a mean of a pairwise similarity score of the plurality of CI from a centroid of the plurality of CI is greater than a threshold, a median of the pairwise similarity score of the plurality of CI from a centroid is greater than a threshold, a mode of the pairwise similarity score of the plurality of CI from a centroid is greater than a threshold, a percentile of the pairwise similarity score of the plurality of CI from a centroid is greater than a threshold, a smallest pairwise similarity score of the plurality of CI from a centroid is greater than a threshold, a weighted mean of the pairwise similarity score of the plurality of CI from a centroid is greater than a threshold, a variance of the pairwise similarity score of the plurality of CI from a centroid is less than a threshold, some possible variation score or distance score a variance of the plurality of CI is less than a threshold, a mean distance of the plurality of CI from a centroid is less than a threshold, a central moment of the plurality of CI is less than a threshold, a kurtosis of the plurality of CI is less than a threshold, a tailedness measure of the plurality of CI is less than a threshold, an outlier measure of the plurality of CI is less than a threshold, and another qualification criterion.

Similar to clause 4, except that "feature" of CI is similar instead of the CI itself. Consider CI in a period of time as a set of random data. The feature may comprise at least one of: a magnitude, a phase, a magnitude square, a subcarrier, a subcarrier magnitude, a subcarrier phase, a tab, a component, a component magnitude, a component phase, a time-domain component, a frequency-domain component, a subset, an average, a weighted average, a trimmed mean, a percentile, a function (e.g. absolute, square, polynomial, root, square root, cubic root, . . . , exponential, trigonometric, log, etc) of another features, etc.

Clause 175. The method of the qualified wireless system of clause 1: wherein there are a plurality of CI of the TSCI in a period of time; wherein the qualification criterion comprises at least one of: >Features of the plurality of CI are similar (described in different wordings) a feature of each of the plurality of CI is similar, the feature of each of the plurality of CI is consistent, there is little variation of the feature among the plurality of CI, there is little outlier of the feature among the plurality of CI, the features of the plurality of CI are in a neighborhood, the features of the plurality of CI are in a dense cluster, a similarity score of the features of the plurality of CI is greater than a threshold, a variation score of the features of the plurality of CI is less than a threshold, a distance score of the features of the plurality of CI is less than a threshold, majority vote a similarity score of the features of the plurality of CI is greater than a threshold for at least a percentage of the period of time, a variation score of the features of the plurality of CI is less than a threshold for at least a percentage of the period of time, a distance score of the features of the plurality of CI is less than a threshold for at least a percentage of the period of time, a similarity score of the features of the plurality of CI is less than a threshold for at most a percentage of the period of time, a variation score of the features of the plurality of CI is greater than a threshold for at most a percentage of the period of time, a distance score of the features of the plurality of CI is greater than a threshold for at most a percentage of the period of time, some possible similarity score based on pairwise similarity score a mean of a pairwise similarity score of the features of the plurality of CI is greater than a threshold, a median of the pairwise similarity score of the features of the plurality of CI is greater than a threshold, a mode of the pairwise similarity score of the features of the plurality of CI is greater than a threshold, a percentile of the pairwise similarity score of the features of the plurality of CI is greater than a threshold, a smallest pairwise similarity score of the features of the plurality of CI is greater than a threshold, a weighted mean of the pairwise similarity score of the features of the plurality of CI is greater than a threshold, a variance of the pairwise similarity score of the features of the plurality of CI is less than a threshold, some possible similarity score based on pairwise similarity score with respect to centroid (mean) a mean of a pairwise similarity score of the features of the plurality of CI from a centroid of the plurality of CI is greater than a threshold, a median of the pairwise similarity score of the features of the plurality of CI from a centroid is greater than a threshold, a mode of the pairwise similarity score of the features of the plurality of CI from a centroid is greater than a threshold, a percentile of the pairwise similarity score of the features of the plurality of CI from a centroid is greater than a threshold, a smallest pairwise similarity score of the features of the plurality of CI from a centroid is greater than a threshold, a weighted mean of the pairwise similarity score of the features of the plurality of CI from a centroid is greater than a threshold, a variance of the pairwise similarity score of the features of the plurality of CI from a centroid is less than a threshold, some possible variation score or distance score a variance of the features of the plurality of CI is less than a threshold, a mean distance of the features of the plurality of CI from a centroid is less than a threshold, a central moment of the features of the plurality of CI is less than a threshold, a kurtosis of the features of the plurality of CI is less than a threshold, a tailedness measure of the features of the plurality of CI is less than a threshold, an outlier measure of the features of the plurality of CI is less than a threshold, and another qualification criterion.

Consider CI in two periods of time. Qualification criterion is that the two sets should form a tight cluster, close to each other.

Clause 176. The method of the qualified wireless system of clause 1: wherein there are a first set of CI in the TSCI in a first period of time; wherein there are a second set of CI in the TSCI in a second period of time; wherein the qualification criterion comprises at least one of: >The plurality of CI are similar (described in different wordings) the first set of CI are self-similar, the first set of CI are self-consistent, the second set of CI are self-similar, the second set of CI are self-consistent, the first set of CI and the second set of CI are similar, there is little variation within the first set of CI, there is little variation within the second set of CI, there is little variation between the first set of CI and the second set of CI, there is little outlier within the first set of CI, there is little outlier within the second set of CI, there is little outlier within the first set of CI and the second set of CI combined, all of the first set of CI are in a neighborhood, all of the second set of CI are in a neighborhood, all of the first set of CI and the second set of CI are in a neighborhood, all of the first set of CI are in a dense cluster, all of the second set of CI are in a dense cluster, all of the first set of CI and second set of CI are in a dense cluster, a similarity score of the first set of CI is greater than a threshold, a similarity score of the second set of CI is greater than a threshold, a similarity score of the first set of CI and the second set of CI is greater than a threshold, a variation score of the first set of CI is less than a threshold, a variation score of the second set of CI is less than a threshold, a variation score of the first set of CI and the second set of CI is less than a threshold, a distance score of the first set of CI is less than a threshold, a distance score of the second set of CI is less than a threshold, a distance score of the first set of CI and the second set of CI is less than a threshold, majority vote a similarity score of the first set of CI is greater than a threshold for at least a percentage of the period of time, a similarity score of the second set of CI is greater than a threshold for at least a percentage of the period of time, a similarity score of the first set of CI and the second set of CI is greater than a threshold for at least a percentage of the period of time, a variation score of the first set of CI is less than a threshold for at least a percentage of the period of time, a variation score of the second set of CI is less than a threshold for at least a percentage of the period of time, a variation score of the first set of CI and the second set of CI is less than a threshold for at least a percentage of the period of time, a distance score of the first set of CI is less than a threshold for at least a percentage of the period of time, a distance score of the second set of CI is less than a threshold for at least a percentage of the period of time, a distance score of the first set of CI and the second set of CI is less than a threshold for at least a percentage of the period of time, a similarity score of the first set of CI is less than a threshold for at most a percentage of the period of time, a similarity score of the second set of CI is less than a threshold for at most a percentage of the period of time, a similarity score of the first set of CI and the second set of CI is less than a threshold for at most a percentage of the period of time, a variation score of the first set of CI is greater than a threshold for at most a percentage of the period of time, a variation score of the second set of CI is greater than a threshold for at most a percentage of the period of time, a variation score of the first set of CI and the second set of CI is greater than a threshold for at most a percentage of the period of time, a distance score of the first set of CI is greater than a threshold for at most a percentage of the period of time, a distance score of the second set of CI is greater than a threshold for at most a percentage of the period of time, a distance score of the first set of CI and the second set of CI is greater than a threshold for at most a percentage of the period of time, some possible similarity score based on pairwise similarity score a mean of a pairwise similarity score of the first set of CI is greater than a threshold, a mean of a pairwise similarity score of the second set of CI is greater than a threshold, a mean of a pairwise similarity score of the first set of CI and the second set of CI is greater than a threshold, a median of the pairwise similarity score of the first set of CI is greater than a threshold, a median of the pairwise similarity score of the second set of CI is greater than a threshold, a median of the pairwise similarity score of the first set of CI and the second set of CI is greater than a threshold, a mode of the pairwise similarity score of the first set of CI is greater than a threshold, a mode of the pairwise similarity score of the second set of CI is greater than a threshold, a mode of the pairwise similarity score of the first set of CI and the second set of CI is greater than a threshold, a percentile of the pairwise similarity score of the first set of CI is greater than a threshold, a percentile of the pairwise similarity score of the second set of CI is greater than a threshold, a percentile of the pairwise similarity score of the first set of CI and the second set of CI is greater than a threshold, a smallest pairwise similarity score of the first set of CI is greater than a threshold, a smallest pairwise similarity score of the second set of CI is greater than a threshold, a smallest pairwise similarity score of the first set of CI and the second set of CI is greater than a threshold, a weighted mean of the pairwise similarity score of the first set of CI is greater than a threshold, a weighted mean of the pairwise similarity score of the second set of CI is greater than a threshold, a weighted mean of the pairwise similarity score of the first set of CI and the second set of CI is greater than a threshold, a variance of the pairwise similarity score of the first set of CI is less than a threshold, a variance of the pairwise similarity score of the second set of CI is less than a threshold, a variance of the pairwise similarity score of the first set of CI and the second set of CI is less than a threshold, some possible similarity score based on pairwise similarity score with respect to centroid (mean) a mean of a pairwise similarity score of the first set of CI from a centroid of the plurality of CI is greater than a threshold, a mean of a pairwise similarity score of the second set of CI from a centroid of the plurality of CI is greater than a threshold, a mean of a pairwise similarity score of the first set of CI and the second set of CI from a centroid of the plurality of CI is greater than a threshold, a median of the pairwise similarity score of the first set of CI from a centroid is greater than a threshold, a median of the pairwise similarity score of the second set of CI from a centroid is greater than a threshold, a median of the pairwise similarity score of the first set of CI and the second set of CI from a centroid is greater than a threshold, a mode of the pairwise similarity score of the first set of CI from a centroid is greater than a threshold, a mode of the pairwise similarity score of the second set of CI from a centroid is greater than a threshold, a mode of the pairwise similarity score of the first set of CI and the second set of CI from a centroid is greater than a threshold, a percentile of the pairwise similarity score of the first set of CI from a centroid is greater than a threshold, a percentile of the pairwise similarity score of the second set of CI from a centroid is greater than a threshold, a percentile of the pairwise similarity score of the first set of CI and the second set of CI from a centroid is greater than a threshold, a smallest pairwise similarity score of the first set of CI from a centroid is greater than a threshold, a smallest pairwise similarity score of the second set of CI from a centroid is greater than a threshold, a smallest pairwise similarity score of the first set of CI and the second set of CI from a centroid is greater than a threshold, a weighted mean of the pairwise similarity score of the first set of CI from a centroid is greater than a threshold, a weighted mean of the pairwise similarity score of the second set of CI from a centroid is greater than a threshold, a weighted mean of the pairwise similarity score of the first set of CI and the second set of CI from a centroid is greater than a threshold, a variance of the pairwise similarity score of the first set of CI from a centroid is less than a threshold, a variance of the pairwise similarity score of the second set of CI from a centroid is less than a threshold, a variance of the pairwise similarity score of the first set of CI and the second set of CI from a centroid is less than a threshold, some possible variation score or distance score a variance of the first set of CI is less than a threshold, a variance of the second set of CI is less than a threshold, a variance of the first set of CI and the second set of CI is less than a threshold, a mean distance of the first set of CI from a centroid is less than a threshold, a mean distance of the second set of CI from a centroid is less than a threshold, a mean distance of the first set of CI and the second set of CI from a centroid is less than a threshold, a central moment of the first set of CI is less than a threshold, a central moment of the second set of CI is less than a threshold, a central moment of the first set of CI and the second set of CI is less than a threshold, a kurtosis of the first set of CI is less than a threshold, a kurtosis of the second set of CI is less than a threshold, a kurtosis of the first set of CI and the second set of CI is less than a threshold, a tailedness measure of the first set of CI is less than a threshold, a tailedness measure of the second set of CI is less than a threshold, a tailedness measure of the first set of CI and the second set of CI is less than a threshold, an outlier measure of the first set of CI is less than a threshold, an outlier measure of the second set of CI is less than a threshold, an outlier measure of the first set of CI and the second set of CI is less than a threshold, and another qualification criterion.

Clause 177. The method of the qualified wireless system of clause 1, further comprising performing a task based on the TSCI.

Clause 178. The method of the qualified wireless system of clause 1, further comprising: monitoring a motion of an object in the venue based on the TSCI, wherein the wireless multipath channel is impacted by the motion of the object in the venue.

Clause 179. The method of the qualified wireless system of clause 16, further comprising: computing a characteristics of the motion of the object based on the TSCI.

Clause 180. The method of the qualified wireless system of clause 17, further comprising: computing a current characteristics of the motion of the object based on at least one of: the TSCI and a past characteristics of the motion of the object.

Clause 181. The method of the qualified wireless system of clause 18, further comprising: computing the current characteristics of the motion of the object based on at least one of: a current window of the TSCI and the past characteristics, and computing the past characteristics of the motion of the object based on at least one of: a past window of the TSCI.

Clause 182. The method of the qualified wireless system of clause 17: wherein the characteristics comprises at least one of: a frequency of a repeating motion, a frequency characteristics, a vital characteristics, a breathing rate, a heart rate, a frequency spectrum, a period of the repeating motion, a temporal characteristics, a temporal profile, a time, a timing, a starting time, an ending time, a duration, a history, a trend, a prediction, a motion type, a motion characteristics, a motion intensity, a motion measure, a motion classification, an identity, a presence, a proximity, a proximity, a count, a people count, a location, a geometry, a speed, a velocity, a displacement, a distance, a range, a direction, an angle, an acceleration, a rotational speed, a rotational characteristics, a gait cycle of the object, gesture, a transient behavior of the object, a transient motion, a change, a change in the motion, a change in frequency, a change of period, a change of gait cycle, an event, a sudden motion, a fall-down event and another characteristics.

Clause 183. The method of the qualified wireless system of clause 17, further comprises: performing a task based on the characteristics of the motion of the object.

Clause 184. The method of the qualified wireless system of clause 21, further comprises: generating a presentation associated with the task.

Clause 185. The method of the qualified wireless system of clause 22, further comprises: generating the presentation in a user-interface (UI) of a user device.

Clause 186. The method of the qualified wireless system of clause 21: wherein the task to comprise at least one of: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing verification, human biometrics detection, human biometrics recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, irregularity detection, locationing, room sensing, tracking, multiple object tracking, indoor tracking, indoor position, indoor navigation, energy management, power transfer, wireless power transfer, object counting, car tracking in parking garage, activating/deactivating/waking/sleeping/controlling a device/system (e.g. security system, access system, alarm, siren, speaker, television, entertainment system, camera, heater/air-conditioning (HVAC) system, ventilation system, lighting system, gaming system, coffee machine, cooking device, cleaning device, housekeeping device, etc), geometry estimation, augmented reality, wireless communication, data communication, signal broadcasting, networking, coordination, administration, encryption, protection, cloud computing, other processing, and another task.

Clause 187. A method of a qualified wireless system, comprising: receiving a wireless signal by a Type 2 heterogeneous wireless device, wherein the wireless signal is transmitted to the Type 2 device by a Type 1 heterogeneous wireless device through a wireless multipath channel of a venue, and obtaining a time series of channel information (CI) of the wireless multipath channel based on the wireless signal using a processor of the Type 2 device, a memory communicatively coupled with the process and a set of instructions stored in the memory, wherein at least one of: the Type 1 device and the Type 2 device is qualified if the time series of CI (TSCI) satisfy a respective qualification criterion.

Clause 188. The method of the qualified wireless system of clause 1: wherein the wireless signal is compatible with a standard.

Clause 189. The method of the qualified wireless system of clause 1: wherein the wireless signal comprises at least one of: a pilot signal, a token signal, a control signal, a physical layer signal, a MAC layer signal, a handshake signal, a probing signal, a pinging signal, an acknowledgement signal, an enquiry signal, a response signal, a data signal, a hybrid signal, a standard compliant signal, a signal with a header, a signal with a header comprising a probing pattern, a signal with a header data field being a probing pattern, a signal with a payload, a signal with an identifier of the Type 1 device, a signal with an identifier of the Type 2 device, a signal with a time stamp, a signal with a destination address, a signal with a destination MAC address, a signal compatible with an IEEE 802 standard, a signal compatible with a mobile communication standard, a signal compatible with a wireless standard, a signal compliant with a protocol, a point-to-point signal, a broadcasting signal, and another signal.

Clause 190. The method of the qualified wireless system of clause 3: wherein the probe signal is compatible with a standard.

The present teaching also discloses a method for automatic online qualification of internet-of-things (IoT) devices as Bots. In one embodiment, two or more mesh access point (AP) devices are used to detect whether a room is static or not. Then one of the AP devices is used to probe an IoT device and perform the qualification test.

For example, IoT devices (e.g. echo dots, apple TV, Vivint cameras, etc.) are qualified to be used as Bots offline. For example, for an echo dot, CSI is captured in an empty room or home, in motion and with breathing. One can check out the quality of CSI. This process can also be moved online to the Origin. To check a device whether it can be used for motion may be performed as follows. First, one can use an existing motion sensing to determine if the home is empty. If it is known that the home is empty, CSI is captured with the IoT device to be qualified. If the CSI is good, one can add the IoT device to the list of sensing for that network. For example, when there are existing Velop devices running at home for Linksys Aware, one can use the Velop to know whether the home is empty. Then the CSI between the Velop and the IoT device is captured to see if the CSI is good. If so, the IoT device is added into the Velop network for sensing.

The disclosed qualification method can be used not only for mesh devices but also for sole routers. In one example, the home router is the only device one can control. There is a whitelist of devices that have already been pre-qualified, e.g. echo dots, google home mini, Belkin WeMo smart plug, wiz light, etc. One can use these devices for initial sensing to know if a home is empty and then can check out other devices to see if it is good and should be qualified.

In various embodiments of the present teaching, an exemplary method of a qualified wireless system can be further disclosed in the following clauses.

Clause 191. The method of the qualified wireless system of Clause 1, further comprising: obtaining a second TSCI of a second wireless multipath channel of the venue based on a second wireless signal transmitted from a second Type 1 device and received by a second Type 2 device, wherein one of the second Type 1 device and the second Type 2 device is qualified and the other one is to-be-qualified; performing a qualifying test based on the second TSCI; determining the to-be-qualified device to be qualified based on a determination that a qualification criterion associated with the qualifying test is satisfied.

When the new device is qualified, a database of qualified device is updated. The database may be associated with the qualified device.

Clause 192. The method of the qualified wireless system of Clause 191, further comprising: updating a database of qualified device associated with at least one of: the to-be-qualified device, the qualified device between the second Type 1 device and the second Type 2 device, the venue, the second wireless signal, the second wireless multipath channel, and at least one associated task associated with at least one of: the qualifying test and the qualification criterion.

The new device may be registered as qualified.

Clause 193. The method of the qualified wireless system of Clause 191, further comprising: registering the to-be-qualified device as a qualified device.

The new device may be registered as qualified for a task.

Clause 194. The method of the qualified wireless system of Clause 191, further comprising: registering the to-be-qualified device as a qualified device for a task associated with at least one of: the qualifying test and the qualification criterion.

After being qualified, the newly qualified device (whether Type 1 or Type 2 device) may be used to work with a third qualified device to obtain a third TSCI which is used for another task.

Clause 195. The method of the qualified wireless system of Clause 191, further comprising: obtaining a third TSCI of a third wireless multipath channel of the venue based on a third wireless signal transmitted between the to-be-qualified device that is determined to be qualified and another qualified device; making the third TSCI available for another task.

The third qualified device may inquire a database of qualified devices and obtain info of the newly-qualified device.

Clause 196. The method of the qualified wireless system of Clause 195: wherein the another qualified device sends an enquiry to a database of qualified devices associated with the venue; wherein the another qualified device obtains from the database an information of the to-be-qualified device.

Some possible info of the newly-qualified device that may be sent to the third qualified device.

Clause 197. The method of the qualified wireless system of Clause 196: wherein the information of the to-be-qualified device comprises at least one of: an identification information (ID) of the to-be-qualified device, a method to communicate with the to-be-qualified device, the second wireless multipath channel, the second wireless signal, a list of supported functionalities of the to-be-qualified device, and a coordination information between the to-be-qualified device and the another qualified device.

Second wireless channel may be 80 MHz. Third wireless channel may be a subset of the 80 MHz (i.e. subset of second channel), e.g. 40 MHz, 20 MHz, 10 MHz, or frequency hopping (e.g. 20 MHz at a time) within the 80 MHz.

Clause 198. The method of the qualified wireless system of Clause 195, further comprising: wherein the second wireless multipath channel comprises the third wireless multipath channel.

Transmission and reception may be coordinated. Perhaps by another device, or the to-be-qualified device, or the another qualified device.

Clause 199. The method of the qualified wireless system of Clause 195, further comprising: coordinating the transmission and reception of the third wireless signal between the to-be-qualified device and the another qualified device.

Transmission and reception may be configured to be in compliance with one or more standard, e.g. WiFi standard, or IEEE 802.11.

Clause 200. The method of the qualified wireless system of Clause 195, further comprising: configuring the transmission and reception of the third wireless signal between the to-be-qualified device and the another qualified device in compliance with at least one of: a protocol, a standard, a signaling requirement.

Clause 201. The method of the qualified wireless system of Clause 200, further comprising: configuring at least one of the following of the third wireless signal: a sounding frequency, sounding period, sounding timing, carrier frequency, bandwidth, protocol, networking, signaling, handshaking, multiple access, channel traffic characteristics, channel availability characteristics, frequency hopping characteristics, choice of probe signal, and another signal characteristics.

Special case: the qualified device may be the Type 1 device, or the Type 2 device (in Clause 1).

Clause 202. The method of the qualified wireless system of Clause 195: wherein the qualified device is one of the Type 1 device and the Type 2 device.

Special case: the qualified device may be the another qualified device.

Clause 203. The method of the qualified wireless system of Clause 195: wherein the another qualified device is the qualified device between the second Type 1 device and the second Type 2 device.

The new device may request for the qualifying test. The venue may be determined to be stationary or otherwise suitable for the qualifying test based on a TSCI captured by a pair of qualified Type 1 and Type 2 devices. Or, the new device request to join the groups of "qualified devices" associated with the qualified device.

Clause 204. The method of the qualified wireless system of Clause 200: receiving a request associated with the to-be-qualified device; determining based on the TSCI that the venue is in a suitable testing condition for the qualifying test, wherein both the Type 1 device and the Type 2 device are qualified; coordinating the second Type 1 device to send the second wireless signal in the second wireless multipath channel of the venue and the second Type 2 device to receive it.

Clause 205. The method of the qualified wireless system of Clause 204: wherein the request comprises at least one of: a request from the to-be-qualified device to the qualified device, a request from the to-be-qualified device to at least one of: the Type 1 device, the Type 2 device, the processor and the memory, a request from the to-be-qualified device to a server communicatively coupled with the qualified device, a request for qualification of the to-be-qualified device, request for the to-be-qualified device to be qualified as a qualified Type 1 (TX) device, request for the to-be-qualified device to be qualified as a qualified Type 1 (TX) device for at least one second task, request for the to-be-qualified device to be qualified as a qualified Type 2 (RX) device, request for the to-be-qualified device to be qualified as a qualified Type 2 (RX) device for the at least one second task, request for the to-be-qualified device to be qualified as both a qualified Type 1 device and a qualified Type 2 device, request for the to-be-qualified device to be qualified as both a qualified Type 1 device and a qualified Type 2 device for the at least one second task, request for commencing the at least one second task with the to-be-qualified device, request for the to-be-qualified device to join the second task, request for performing the qualifying test for the to-be-qualified device, request for performing the qualifying test associated with at least one second task for the to-be-qualified device, request for the to-be-qualified device to join a group of qualified devices, request for the to-be-qualified device to join a group of qualified devices associated with at least one second task, request for the to-be-qualified device to join a group of qualified devices associated with at least one of: a Type 1 (TX) device and a Type 2 (RX) device associated with the second task, request for transmission and reception of the second wireless signal in the venue for at least one of: the qualifying test and the at least one second task, request for usage of the second wireless multipath channel in the venue for at least one of: the qualifying test and the at least one second task, request for transmission and reception of the second wireless signal in the second wireless multipath channel for at least one of: the qualifying test and the at least one second task, and another request.

"Suitable testing condition" may comprise: the venue has no change and no object motion, or the TSCI remain steady or stationary.

Clause 206. The method of the qualified wireless system of Clause 204: wherein the suitable testing condition comprises at least one of: no detectable motion is detected in a motion detection test based on the TSCI, motion level is low in a motion detection test based on the TSCI, no detectable change is detected in a change detection test based on the TSCI, the wireless multipath channel is stationary in a stationarity test based on the TSCI, the wireless multipath channel is steady in a steadiness test based on the TSCI, the channel traffic of the wireless multipath channel is low, the noise level in wireless multipath channel traffic is low, a target object motion associated with at least one of: the qualifying test and a task associated with the qualifying test, is detected based on the TSCI, the target object motion is anticipated based on the TSCI.

The target object motion is successfully monitored based on the TSCI. The target repeatable object motion is detected based on the TSCI, and another condition of the channel based on the TSCI. Special case: both the second Type 1 device and second Type 2 device need to be qualified and are qualified together in the qualified test.

Clause 207. The method of the qualified wireless system of Clause 200: wherein both the second Type 1 device and the second Type 2 device are to-be-qualified devices; wherein both the to-be-qualified devices are determined to be qualified based on the determination that the qualification criterion associated with the qualifying test is satisfied.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method of a qualified wireless system, comprising:
    transmitting a wireless signal from a Type 1 device to a Type 2 device through a wireless multipath channel of a venue, wherein the Type 1 device and the Type 2 device are heterogeneous wireless devices;
    receiving the wireless signal by the Type 2 device;
    obtaining a time series of channel information (TSCI) of the wireless multipath channel based on the wireless signal, wherein the TSCI comprises: a first channel information (CI) obtained by the Type 2 device at a first time during a testing phase of a wireless monitoring, and a second CI obtained by the Type 2 device at a second time during the testing phase of the wireless monitoring;
    performing a qualification test based on the TSCI for at least one to-be-qualified device, which is at least one of: the Type 1 device, a module of the Type 1 device, an integrated circuit (IC) of the Type 1 device, the Type 2 device, a module of the Type 2 device, or an IC of the Type 2 device, to determine whether each of the at least one to-be-qualified device is a qualified device or a disqualified device with respect to a task related to the wireless monitoring;
    determining that each of the at least one to-be-qualified device is a qualified device based on a determination that a respective qualification criterion associated with the to-be-qualified device is satisfied, to obtain at least one qualified device, wherein the respective qualification criterion comprises that:
        a similarity score between a feature of the first CI and the feature of a predictor is greater than a first threshold, wherein the predictor is a prediction of the first CI based on the second CI, wherein the first CI and the second CI are obtained at the first time and the second time respectively during the testing phase of the wireless monitoring, and
        a difference between the first time and the second time is less than a second threshold; and
    performing the task based on the TSCI using the at least one qualified device.

2. The method of claim 1, wherein the Type 1 device and the Type 2 device are at least one of:
    a same device;
    two different devices placed at two different locations in the venue; or
    two different and collocated devices placed at similar locations in the venue.

3. The method of claim 1, wherein:
    there are multiple pairs of Type 1 devices and Type 2 devices in the venue performing at least one of: a joint task, a group task, or an individual task;
    each respective Type 2 device of each pair receives a respective wireless signal asynchronously from the respective Type 1 device of the pair and obtains asynchronously a respective TSCI;
    the Type 1 device and the Type 2 device of a first pair are collocated; and
    the Type 1 device and the Type 2 device of a second pair are placed at two different locations in the venue.

4. The method of claim 1, further comprising:
    associating an identifier (ID) with at least one of: the Type 1 device or the Type 2 device, wherein the ID comprises at least one of:
        a name, a number, an alphanumeric ID, a string of text, numbers, symbols, a file, a database, an item of the database, a pointer to the item, a link to a webpage, a link to a storage,
        a MAC address, an IP address, a network address, a network ID, a domain ID, a web ID, an internet ID, a mobile network ID, a LAN ID, a platform ID, a software ID, a software application ID, an administration ID, a supervision ID, a hardware ID, a device ID, a device profile, a hardware component ID, a computer ID, a processor ID, a storage ID, a process ID, a serial number, a class, a class information, a category, a category information, a performance information, a capability information, a policy information, a pair ID of the Type 1 device and the Type 2 device, a pair profile, a link ID, a link profile, an antenna ID, an antenna profile, a system ID,
        a user, a customer, a supervisor, super-user, an administrator, a guardian, a service, an account, a password, a service account, a user account, a user profile, a user name, a user password, a user information, a user ID, a service provider, a service profile, a manufacturer, a sales channel, a vendor, a retailer, a distribution channel, a content channel, an Apple ID, a Amazon ID, a Samsung ID, a Google ID, a Facebook ID, a Microsoft ID, a company ID, a service ID, a service provider ID, a service ID, an access ID, a hash of another ID, a user association, a user grouping, an account privilege, a user history, a task, a task ID, a task information, a task requirement, a user associated with the task, a venue ID, a physical address, a physical location, a home, a household, an office, a company, a school, a warehouse, a store, a factory, a station, a stadium, a hall, an enclosure, a venue, a site, a district, a zone, a region, an area, a proximity, a neighborhood, a map, a map location, a location-based information, a street, a city, a county, a state, a province, a precinct, a prefecture, a country, a continent, a zip code, a postal code, a GPS coordinate, another code, a phone number, a payment card information, a grouping, a classification, a category, or another ID.

5. The method of claim 4, further comprising:
sharing the ID between any two of: the Type 1 device, the Type 2 device, another wireless heterogeneous device, or a user device,
wherein the ID is shared based on at last one of: a standard, a WiFi standard, a WLAN standard, a mesh network standard, an IEEE standard, an IEEE 802 standard, an IEEE 802.11 standard, an IEEE 802.15 standard, an IEEE 802.16 standard, a WiFi Alliance specification, a 3GPP standard, a mobile communication standard, a cellular communication standard, 3G/4G/LTE/5G/6G/7G/8G, an international standard, a national standard, an industry standard, a de facto standard, a protocol, a handshake, an enquiry, a response, an acknowledge, a database, another format, another channel, another exchange or another mechanism.

6. The method of claim 4, wherein the ID varies over time based on at least one of:
a standard, a protocol, an established protocol, an interoperable protocol, a specification, a requirement, a qualification requirement, the qualification criterion,
a protocol agreed by the Type 1 device and the Type 2 device,
a timing agreed by the Type 1 device and the Type 2 device,
a timing based on at least one of: the standard or the protocol,
a strategy, a time table, a user setting, a user request, a control by a server,
the Type 1 device, the Type 2 device, another device, the server,
a control signal communicated between two of: the Type 1 device, the Type 2 device, the another device, the server, another Type 1 device, another Type 2 device,
a situation, a condition of the wireless multipath channel, another criterion, or another mechanism.

7. The method of claim 1, further comprising:
transmitting a first part of the wireless signal by the Type 1 device using at least one of: a first carrier frequency, a first channel, a first modulation, a first preamble, a first header, a first physical layer (PHY) header, a first media access control layer (MAC) header, a first network layer header, a first transport layer header, a first session layer header, a first presentation layer header, a first application layer header, a first data payload, a first antenna, or a first group of antennas, of the Type 1 device; and
transmitting a second part of the wireless signal by the Type 1 device using at least one of: a second carrier frequency, a second channel, a second modulation, a second preamble, a second header, a second PHY header, a second MAC header, a second network layer header, a second transport layer header, a second session layer header, a second presentation layer header, a second application layer header, a second data payload, a second antenna, or a second group of antennas, of the Type 1 device.

8. The method of claim 1, wherein:
a first characteristics of a first part of the wireless signal and a second characteristics of a second part of the wireless signal are at least one of: determined, worked out, exchanged, hand-shaked, shared, negotiated, arranged, or coordinated, among at least two of: the Type 1 device, the Type 2 device or another device, based on at least one of:
a standard, a protocol, an established protocol, an interoperable protocol, a specification, a requirement, a qualification requirement, the qualification criterion,
a protocol agreed by the Type 1 device and the Type 2 device,
a timing agreed by the Type 1 device and the Type 2 device,
a timing based on at least one of: the standard or the protocol,
a strategy, a time table, a user setting, a user request, a control by a server,
the Type 1 device, the Type 2 device, another device, the server,
a control signal communicated between two of: the Type 1 device, the Type 2 device, the another device, the server, another Type 1 device, another Type 2 device,
a situation, a condition of the wireless multipath channel, another criterion, or another mechanism.

9. The method of claim 1, wherein the wireless signal comprises at least one of:
an electromagnetic (EM) wave, a radio frequency (RF) signal, a RF transmission, a RF signal transmitted by one or more transmitting antennas, a RF signal received by one or more receiving antennas, a RF signal repeated by a RF repeater, a RF signal retransmitted by a RF repeater, a 800/900 MHz signal, a 1.8/1.9 GHz signal, a 2.4 GHz signal, a 5 GHz signal, a 6 GHz signal, a 24 GHz signal, a 76-81 GHz signal, a 28 GHz signal, a 60 GHz signal, a 122 GHz signal, a 244 GHz signal, a microwave signal, an infrared signal, a light signal, an ultraviolet signal, an audio signal,
an OFDM signal, a CDMA signal, a FDMA signal, a TDMA signal, an OFDMA signal, a MIMO signal, a MU-MIMO signal, a QAM signal, a 4-QAM, a 8-QAM, a 16-QAM, a 32-QAM, a 64-QAM, a 128-QAM, a 256-QAM, a 512-QAM, a 1024-QAM, a 2048-QAM, a 4096-QAM, a 8192-QAM, a 16384-QAM, a 32768-QAM, a 65536-QAM,
a WiFi signal, an IEEE 802 compliant signal, an IEEE 802.11 signal, an 802.15 signal, an IEEE 802.16 signal, a standard compliant signal, a wireless local area network (WLAN) signal, a Zigbee signal, a Bluetooth signal, an RFID signal, a cellular network signal, a 3GPP compliant signal, a 3G/4G/LTE/5G/6G/7G/8G signal, a cellular communication signal, an RF signal that uses an ISM band, an RF signal that uses an unlicensed band, an RF signal that uses a licensed band, a GPS signal, a baseband signal, a bandlimited signal, an ultra-wide band (UWB) signal, a wireless standard-compliant signal, a frequency-hopping signal, a burst signal, a train of signals, a steady stream of signals, a stream of signals with irregular timings, a stream of signals with regular timings, a null signal, a protocol signal, a protocol compliant signal, a data signal, a control signal, a beacon signal, a pilot signal, a probe signal, an excitation signal, an illumination signal, a reference signal, a training signal, a synchronization signal, a request signal, a enquiry signal, a response signal, an acknowledgement signal, a downlink signal, an uplink signal, a unicast signal, a multicast signal, a broadcast signal, a pulsed signal, a signal burst, a motion probe signal, a motion detection signal, a motion sensing signal, a line-of-sight (LOS) signal, a non-line-of-sight (NLOS) signal, a combination of signals, a mixture of signals, a succession of signals, a series of signals, another wireless signal;

a response to a second wireless signal transmitted from at least one of: the Type 2 device, another Type 1 device, another Type 2 device, or another wireless device, to the Type 1 device, a response to at least one of: a request signal, a query signal, a probe-request signal, a command signal, a control signal, a data signal, a non-wireless signal, an electronic signal, or another signal, received by the Type 1 device, an acknowledgement to the another wireless signal, a protocol signal, a handshake signal, an enquiry signal, a request signal, a query signal, a probe-request signal, a command signal, a control signal, a data signal, a response signal, a probe response signal, an acknowledgement signal, a reply signal, a beacon signal, a pilot signal, a probe signal, a sounding signal, a broadcast signal, a train of signals, or a part of a handshake between the Type 1 device and the Type 2 device.

10. The method of claim 1, wherein:

the wireless signal comprises a response to a second wireless signal received by the Type 1 device;

the second wireless signal comprises a series of probe-request signals;

the wireless signal comprises a series of sounding signals, each of which is a probe-response signal to a respective probe-request signal of the second wireless signal; and the method further comprises controlling, based on the second wireless signal, at least one of: a timing, an appearance, a generation, a repetition, a repeated occurrence, a regular occurrence, a cyclic occurrence, a periodic occurrence, an occurrence with a regular interval, a sounding interval, a sounding period, a sounding rate, a sounding timing, or another aspect, of the sounding signals of the wireless signal, by controlling at least one of: a timing, an appearance, a generation, a repetition, a repeated occurrence, a regular occurrence, a cyclic occurrence, a periodic occurrence, an occurrence with a regular interval, a sounding interval, a sounding period, a sounding rate, a sounding timing, or another aspect, of the probe-request signals of the second wireless signal.

11. The method of claim 1, wherein:

the wireless signal is at least one of: a response, a reply, an acknowledgement, or a handshake, to a second wireless signal; and the method further comprises at least one of:

controlling a characteristics of the wireless signal by controlling corresponding characteristics of the second wireless signal, controlling at least one timing of the wireless signal by controlling at least one timing of the second wireless signal, coordinating a timing of at least one of: the series of probe signals, the TSCI, the task, or a user requirement of the task, between at least two of: the Type 1 device, the Type 2 device, or another device, signaling an information regarding a timing of at least one of: the series of probe signals, the TSCI, the task, or a user requirement of the task, between at least two of: the Type 1 device, the Type 2 device, or another device, or signaling a capability regarding a timing of at least one of: the series of probe signals, the TSCI, the task, or a user requirement of the task, between at least two of: the Type 1 device, the Type 2 device, or another device.

12. The method of claim 1, further comprising:

obtaining an information of at least one of: the wireless signal comprising a series of probe signals, or the TSCI, wherein the information comprises at least one of:

at least one of: an attribute, a size, a dimension, a cardinality, an amount of components, or a count of components of a CI, associated with at least one of: the TSCI, or a CI of the TSCI, at least one of: a characteristics, a property, a feature, a function, a data type, a precision level, a data structure, an amplitude, a phase, or a power, associated with at least one of: the TSCI, a CI of the TSCI, or a component of the CI, at least one of: a time stamp, a timing, a time duration, a sounding rate, a sounding period, a sounding timing, a regularity, an accuracy, a consistency, an irregularity, a timing jitter, a variation, a deviation, an error, a channel condition, a noise power, an interference, or another channel information associated with at least one of: the TSCI, a CI of the TSCI, a component of the CI, the wireless signal, a probe signal of the wireless signal, the wireless multipath channel, the Type 1 device or the Type 2 device, at least one of: an amount of transmit antenna, a type of transmit antenna, an information of transmit antenna, an antenna gain, a group of at least one transmit antenna, an information of transmit radio, a hardware, a processor, a hardware accelerator, a memory, a sensor, a module, a software, an operating system, an application software, a firmware, a version of a set of instructions, an update history of the set of instructions, a connectivity, a network neighborhood, a capability, an available computing power, a memory bandwidth, a data transfer capability, a storage capacity, a wake-up timing, an operating condition, a setting, a standard compliance, a battery level, a power setting, a system setting, or a location of the Type 1 device, at least one of: an amount of receive antenna, a type of receive antenna, an information of receive antenna, an antenna gain, a group of at least one receive antenna, an information of receive radio, a hardware, a processor, a hardware accelerator, a memory, a sensor, a module, a software, an operating system, an application software, a firmware, a version of a set of instructions, an update history of the set of instructions, a connectivity, a network neighborhood, a capability, an available computing power, a memory bandwidth, a data transfer capability, a storage capacity, a wake-up timing, an operating condition, a setting, a battery level, a power setting, a system setting, or a location of the Type 2 device, at least one of: an amount of transmit antenna, an amount of receive antenna, a type of transmit antenna, a type of receive antenna, a group of at least one transmit antenna, a group of at least one receiver antenna, a processor, a memory, a software, a firmware, a version of a set of instructions, a update history of the set of instructions, a connectivity, a network neighborhood, a capability, or a location, of a wireless relaying device associated with at least one of: the TSCI, a CI of the TSCI, a component of the CI, the wireless signal, the wireless multipath channel, or the Type 1 device, wherein the wireless signal is relayed by the wireless relaying device during the transmission from the Type 1 device to the Type 2 device, a noise condition associated with at least one of: the TSCI, a CI of the TSCI, a component of the CI, the wireless multipath channel, the Type 1 device or the Type 2 device, a signal-to-noise condition associated with at least one of: the TSCI, a CI of the TSCI, a component of the CI, the wireless signal, the wireless multipath channel, the Type 1 device or the Type 2 device, a bandwidth associated with at least one of: the TSCI, a CI of the TSCI, a component of the CI, the wireless signal, the wireless multipath channel, the Type 1 device or the Type 2 device, an effective bandwidth associated with at least one of: the TSCI, a CI of the TSCI, a component of the CI, the wireless signal, the wireless multipath channel, the Type 1 device or the Type 2 device, a quantity associated with at least one of: the TSCI, or a CI of the TSCI, a type associated with at least one of: the TSCI, or a CI of the TSCI, or another information.

13. The method of claim 1, further comprising:
determining an agreed set of settings between the Type 1 device and the Type 2 device based on a standardized protocol.

14. The method of claim 1, further comprising:
exchanging an information between the Type 1 device and the Type 2 device, wherein the information comprises at least one of:
a meta-data, a device information, a manufacturing information, a model information, a version information, a registration information, an identification information,
a classification, a category, a grouping, a restriction, a usage information, a service provider information, a service information, a sales information, a logistical information,
a system information, a companion system information, a capability information, a power information, a computation information, a processor information, a storage information,
a supported system information, a supported task information, a performance requirement, a carrier frequency, a frequency information, a timing information, an antenna information, a location-based information,
a software or firmware information, an updating information, a hardware information, a component information,
a network information, a wireless network information, an address information, an access information, a security protection information, an encryption information, an internet information, or another information, of at least one: the Type 1 device, the Type 2 device, or a device communicatively coupled with the Type 1 device or the Type 2 device.

15. The method of claim 1, further comprising:
receiving the wireless signal based on the IC of the Type 2 device;
computing the TSCI based on the IC;
obtaining the TSCI from the IC, wherein the qualification criterion associated with the IC of the Type 2 device comprises at least one of:
an estimation error requirement of each CI,
an estimation error requirement of the TSCI,
a requirement of at least one of: a motion statistics, a motion feature, an intermediate analytics or a task analytics, computed based on the TSCI,
a precision requirement of each CI,
a precision requirement of the TSCI,
a representation requirement of the TSCI,
a format requirement of the TSCI,
an encoding requirement of the TSCI,
a real-time requirement of the TSCI,
a buffering requirement of the TSCI,
a memory requirement of the TSCI,
a stability requirement of the TSCI,
a consistency requirement of the TSCI,
a temporal consistency requirement of the TSCI,
a timing requirement of the TSCI,
a correlation requirement of the TSCI,
an outlier requirement of the TSCI,
a deviation requirement of the TSCI,
a sensitivity requirement of the TSCI,
a tail requirement of the TSCI,
a percentile requirement of the TSCI,
a quantile requirement of the TSCI,
a scalability requirement of the TSCI,
an indicator to communicate the availability of at least one of: a CI, a group of recent CI, or the whole TSCI, or
an accuracy requirement of the computation of more than one consecutive CI; and
monitoring a motion of an object in the venue based on the TSCI.

16. The method of claim 1, wherein the respective qualification criterion further comprises at least one of:
a requirement of the venue,
a requirement of the number of antennas of the Type 1 device, or
a requirement of the number of antennas of the Type 2 device.

17. The method of claim 1, wherein the respective qualification criterion comprises the requirement of the venue that comprises at least one of:
a type-of-venue requirement comprising at least one of: indoor, outdoor, semi-outdoor, underground, house, office, building, warehouse, lab, or special testing facility,
a type-of-partition requirement comprising at least one of: wall plaster, dry wall, fiberboard, paneling, gypsum, wood, metal, vinyl, stucco, shingle, asphalt, brick, stone, masonry, concrete, cement, tile, ceramic tile, or glass,
a size-of-venue requirement comprising at least one of: volume, area, width, length, height, depth, thickness, or layering,
a structure requirement comprising at least one of: furniture, supporting structures, columns, beams, tables, chairs, shelves, cabinets, or vehicles,
a multipath-richness requirement of the venue,
a state requirement of the venue,
a motion requirement of the venue,
a composition requirement of the venue,
the venue is not changing at least temporarily,
the venue is stationary at least temporarily,
the venue is motionless at least temporarily, or
there is no object moving in the venue at least temporarily;
the requirement of the wireless multipath channel comprises at least one of:
a bandwidth requirement comprising of at least one of: 10 MHz, 20 MHz, 30 MHz, 40 MHz, 50 MHz, 60 MHz, 70 MHz, 80 MHz, 100 MHz, 160 MHz, or 320 MHz,
a carrier frequency requirement based on at least one of: an ISM band centered near at least one of: 6.78 MHz, 13.56 MHz, 27.12 MHz, 40.68 MHz, 4.5 GHz, 33.93 MHz, 915 MHz, 2.45 GHz, 5 GHz, 5.8 GHz, 24.125 GHz, 61.25 GHz, 122.5 GHz, and 245 GHz, a mobile communication band, a mobile communication channel, 3G, 4G, LTE, 5G, 6G, 7G, a WiFi band, or a WiFi channel,
a standard compliance requirement comprising at least one of: WLAN, WiFi, a 802.11 standard, a 802.15 standard, a 802.20 standard, a mobile communication standard, a 3GPP standard, 3G, 4G, LTE, 5G, 6G, 7G, 8G, a Bluetooth standard, a standard using OFDM, or a standard comprising computation of the CI,
a protocol requirement,
a network requirement,
a signaling requirement,
a signal handshaking requirement,
a multiple access requirement,
a channel traffic requirement,
a channel availability requirement,
a frequency hopping requirement, or
a data transmission requirement;
the requirement of the wireless signal comprises at least one of:
the wireless signal comprising a time series of probe signals (TSPS),
a protocol requirement,
a network requirement,
a signaling requirement,
a signal handshaking requirement,
a multiple access requirement,
a channel traffic requirement,
a modulation requirement,
a frequency hopping requirement,
a data transmission requirement,
a transmission power requirement of the TSPS,
a probing frequency requirement of the TSPS,
a probing timing requirement of the TSPS,
a sounding frequency requirement of the TSPS,
a sounding timing requirement of the TSPS,
a timing requirement of the TSPS,
a rapid-firing timing requirement of the TSPS,
a pulsating timing requirement of the TSPS,
a progressive timing requirement of the TSPS,
a time-varying timing requirement of the TSPS,
a timing jitter requirement of the TSPS,
a broadcasting requirement associated with each probe signal,
a signaling requirement associated with each probe signal,
a protocol requirement associated with each probe signal,
a handshake requirement associated with each probe signal,
a requirement of a predecessor signal that triggers the Type 1 device to send a probe signal,
a requirement of a predecessor signal to which a probe signal is an acknowledgement in a handshake,
a requirement of a predecessor signal to which a probe signal is a reply in a handshake,
a data field requirement of a probe signal that causes the obtaining of CI by the Type 2 device,
a header field requirement of a probe signal that causes the obtaining of CI by the Type 2 device,
a data field requirement of a packet of a probe signal that causes the obtaining of CI by the Type 2 device, or
a control data field requirement of a probe signal that causes the obtaining of CI by the Type 2 device;
the requirement of the Type 1 device comprises at least one of:
a placement requirement,
an installation requirement,
a processor requirement,
a memory requirement,
a software requirement,
a system requirement,
a power requirement,
an interface requirement,
a transmission requirement,
a housing requirement,
a signaling requirement,
an environment requirement,
an antenna-type requirement,
an antenna-count requirement,
an antenna-gain requirement,
an antenna-placement requirement,
an antenna-radiation requirement,
an antenna-material requirement, or
an antenna-structure requirement;
the requirement of the Type 2 device comprises at least one of:
a placement requirement,
an installation requirement,
a processor requirement,
a memory requirement,
a software requirement,
a system requirement,
a power requirement,
an interface requirement,
a transmission requirement,
a housing requirement,
a signaling requirement,
an environment requirement, an antenna-type requirement,
an antenna-count requirement,
an antenna-gain requirement,
an antenna-placement requirement,
an antenna-radiation requirement,
an antenna-material requirement, or
an antenna-structure requirement.

18. The method of claim 1, wherein:
the qualification criterion further comprises at least one of:
  the first CI and the second CI are similar,
  there is little variation between the first CI and the second CI,
  the first CI is in a neighborhood of the second CI,
  a variation score between the first CI and the second CI is less than a threshold,
  a distance score between the first CI and the second CI is less than a threshold,
  the first CI and the predictor of the first CI based on the second CI are similar,
  there is little variation between the first CI and the predictor,
  the first CI is in a neighborhood of the predictor,
  a similarity score between the first CI and the predictor is greater than a threshold,
  a variation score between the first CI and the predictor is less than a threshold,
  a distance score between the first CI and the predictor is less than a threshold,
  a feature of the first CI and the feature of the second CI are similar,
  the feature of the first CI is in a neighborhood of the feature of the second CI,
  a similarity score between the feature of the first CI and the feature of the second CI is greater than a threshold,
  a variation score between the feature of the first CI and the feature of the second CI is less than a threshold,
  a distance score between the feature of the first CI and the feature of the second CI is less than a threshold,
  the feature of the first CI and the feature of the predictor of the first CI based on the second CI are similar,
  the feature of the first CI is in a neighborhood of the feature of the predictor,
  a variation score between the feature of the first CI and the feature of the predictor is less than a threshold,
  a distance score between the feature of the first CI and the feature of the predictor is less than a threshold,
  the first time and the second time are similar,
  the first time is in a neighborhood of the second time,
  the first CI and the second CI are neighboring CI in the TSCI, or
  the first time and the second time are neighboring sampling time of the Type 2 device.

19. The method of claim 1, wherein:
the wireless signal comprises a time series of probe signals (TSPS);
a first probe signal transmitted by the Type 1 device at a first transmitting time is associated with the first CI;
a second probe signal transmitted by the Type 1 device at a second transmitting time is associated with the second CI; and
the qualification criterion comprises at least one of:
  the first transmitting time and the second transmitting time are similar,
  there is little variation between the first transmitting time and the second transmitting time,
  the first transmitting time is in a neighborhood of the second transmitting time,
  a first probe signal and the second probe signal are neighboring probe signals in the time series of probe signal,
  the first transmitting time and the second transmitting time are neighboring transmitting time of the Type 1 device,
  a difference between the first transmitting time and the second transmitting time is less than a threshold,
  two times of: the first transmitting time, the first time, the second transmitting time or the second time, are similar,
  there is little variation between the two times,
  the two times are in a neighborhood of each other, or
  a difference between the two times is less than a threshold.

20. The method of claim 1, wherein:
there are a plurality of CI in the TSCI in a period of time;
the qualification criterion comprises at least one of:
  the plurality of CI are similar,
  the plurality of CI are consistent,
  there is little variation among the plurality of CI,
  there is little outlier among the plurality of CI,
  all of the plurality of CI are in a neighborhood,
  all of the plurality of CI are in a dense cluster,
  a similarity score of the plurality of CI is greater than a threshold,
  a variation score of the plurality of CI is less than a threshold,
  a distance score of the plurality of CI is less than a threshold,
  a similarity score of the plurality of CI is greater than a threshold for at least a percentage of the period of time,
  a variation score of the plurality of CI is less than a threshold for at least a percentage of the period of time,
  a distance score of the plurality of CI is less than a threshold for at least a percentage of the period of time,
  a similarity score of the plurality of CI is less than a threshold for at most a percentage of the period of time,
  a variation score of the plurality of CI is greater than a threshold for at most a percentage of the period of time,
  a distance score of the plurality of CI is greater than a threshold for at most a percentage of the period of time,
  a mean of a pairwise similarity score of the plurality of CI is greater than a threshold,
  a median of the pairwise similarity score of the plurality of CI is greater than a threshold,
  a mode of the pairwise similarity score of the plurality of CI is greater than a threshold,
  a percentile of the pairwise similarity score of the plurality of CI is greater than a threshold,
  a smallest pairwise similarity score of the plurality of CI is greater than a threshold,
  a weighted mean of the pairwise similarity score of the plurality of CI is greater than a threshold,
  a variance of the pairwise similarity score of the plurality of CI is less than a threshold,
  a mean of a pairwise similarity score of the plurality of CI from a centroid of the plurality of CI is greater than a threshold, a median of the pairwise similarity score of the plurality of CI from a centroid is greater than a threshold,
a mode of the pairwise similarity score of the plurality of CI from a centroid is greater than a threshold,
a percentile of the pairwise similarity score of the plurality of CI from a centroid is greater than a threshold,
a smallest pairwise similarity score of the plurality of CI from a centroid is greater than a threshold,
a weighted mean of the pairwise similarity score of the plurality of CI from a centroid is greater than a threshold,
a variance of the pairwise similarity score of the plurality of CI from a centroid is less than a threshold,
a variance of the plurality of CI is less than a threshold,
a mean distance of the plurality of CI from a centroid is less than a threshold,
a central moment of the plurality of CI is less than a threshold,
a kurtosis of the plurality of CI is less than a threshold,
a tailedness measure of the plurality of CI is less than a threshold,
an outlier measure of the plurality of CI is less than a threshold,
a feature of each of the plurality of CI is similar,
the feature of each of the plurality of CI is consistent,
there is little variation of the feature among the plurality of CI,
there is little outlier of the feature among the plurality of CI,
the features of the plurality of CI are in a neighborhood,
the features of the plurality of CI are in a dense cluster,
a similarity score of the features of the plurality of CI is greater than a threshold,
a variation score of the features of the plurality of CI is less than a threshold,
a distance score of the features of the plurality of CI is less than a threshold,
a similarity score of the features of the plurality of CI is greater than a threshold for at least a percentage of the period of time,
a variation score of the features of the plurality of CI is less than a threshold for at least a percentage of the period of time,
a distance score of the features of the plurality of CI is less than a threshold for at least a percentage of the period of time,
a similarity score of the features of the plurality of CI is less than a threshold for at most a percentage of the period of time,
a variation score of the features of the plurality of CI is greater than a threshold for at most a percentage of the period of time,
a distance score of the features of the plurality of CI is greater than than a threshold for at most a percentage of the period of time,
a mean of a pairwise similarity score of the features of the plurality of CI is greater than a threshold,
a median of the pairwise similarity score of the features of the plurality of CI is greater than a threshold,
a mode of the pairwise similarity score of the features of the plurality of CI is greater than a threshold,
a percentile of the pairwise similarity score of the features of the plurality of CI is greater than a threshold,
a smallest pairwise similarity score of the features of the plurality of CI is greater than a threshold,
a weighted mean of the pairwise similarity score of the features of the plurality of CI is greater than a threshold,
a variance of the pairwise similarity score of the features of the plurality of CI is less than a threshold,
a mean of a pairwise similarity score of the features of the plurality of CI from a centroid of the plurality of CI is greater than a threshold,
a median of the pairwise similarity score of the features of the plurality of CI from a centroid is greater than a threshold,
a mode of the pairwise similarity score of the features of the plurality of CI from a centroid is greater than a threshold,
a percentile of the pairwise similarity score of the features of the plurality of CI from a centroid is greater than a threshold,
a smallest pairwise similarity score of the features of the plurality of CI from a centroid is greater than a threshold,
a weighted mean of the pairwise similarity score of the features of the plurality of CI from a centroid is greater than a threshold,
a variance of the pairwise similarity score of the features of the plurality of CI from a centroid is less than a threshold,
a variance of the features of the plurality of CI is less than a threshold,
a mean distance of the features of the plurality of CI from a centroid is less than a threshold,
a central moment of the features of the plurality of CI is less than a threshold,
a kurtosis of the features of the plurality of CI is less than a threshold,
a tailedness measure of the features of the plurality of CI is less than a threshold, or
an outlier measure of the features of the plurality of CI is less than a threshold.

21. The method of claim 1, wherein:
there are a first set of CI in the TSCI in a first period of time;
there are a second set of CI in the TSCI in a second period of time;
the qualification criterion comprises at least one of:
the first set of CI are self-similar,
the first set of CI are self-consistent,
the second set of CI are self-similar,
the second set of CI are self-consistent,
the first set of CI and the second set of CI are similar,
there is little variation within the first set of CI,
there is little variation within the second set of CI,
there is little variation between the first set of CI and the second set of CI,
there is little outlier within the first set of CI,
there is little outlier within the second set of CI,
there is little outlier within the first set of CI and the second set of CI combined,
all of the first set of CI are in a neighborhood,
all of the second set of CI are in a neighborhood,
all of the first set of CI and the second set of CI are in a neighborhood,
all of the first set of CI are in a dense cluster,
all of the second set of CI are in a dense cluster,
all of the first set of CI and second set of CI are in a dense cluster, a similarity score of the first set of CI is greater than a threshold,
a similarity score of the second set of CI is greater than a threshold,
a similarity score of the first set of CI and the second set of CI is greater than a threshold,
a variation score of the first set of CI is less than a threshold,
a variation score of the second set of CI is less than a threshold,
a variation score of the first set of CI and the second set of CI is less than a threshold,
a distance score of the first set of CI is less than a threshold,
a distance score of the second set of CI is less than a threshold,
a distance score of the first set of CI and the second set of CI is less than a threshold,
a similarity score of the first set of CI is greater than a threshold for at least a percentage of the period of time,
a similarity score of the second set of CI is greater than a threshold for at least a percentage of the period of time,
a similarity score of the first set of CI and the second set of CI is greater than a threshold for at least a percentage of the period of time,
a variation score of the first set of CI is less than a threshold for at least a percentage of the period of time,
a variation score of the second set of CI is less than a threshold for at least a percentage of the period of time,
a variation score of the first set of CI and the second set of CI is less than a threshold for at least a percentage of the period of time,
a distance score of the first set of CI is less than a threshold for at least a percentage of the period of time,
a distance score of the second set of CI is less than a threshold for at least a percentage of the period of time,
a distance score of the first set of CI and the second set of CI is less than a threshold for at least a percentage of the period of time,
a similarity score of the first set of CI is less than a threshold for at most a percentage of the period of time,
a similarity score of the second set of CI is less than a threshold for at most a percentage of the period of time,
a similarity score of the first set of CI and the second set of CI is less than a threshold for at most a percentage of the period of time,
a variation score of the first set of CI is greater than a threshold for at most a percentage of the period of time,
a variation score of the second set of CI is greater than a threshold for at most a percentage of the period of time,
a variation score of the first set of CI and the second set of CI is greater than a threshold for at most a percentage of the period of time,
a distance score of the first set of CI is greater than a threshold for at most a percentage of the period of time,
a distance score of the second set of CI is greater than a threshold for at most a percentage of the period of time,
a distance score of the first set of CI and the second set of CI is greater than a threshold for at most a percentage of the period of time,
a mean of a pairwise similarity score of the first set of CI is greater than a threshold,
a mean of a pairwise similarity score of the second set of CI is greater than a threshold,
a mean of a pairwise similarity score of the first set of CI and the second set of CI is greater than a threshold,
a median of the pairwise similarity score of the first set of CI is greater than a threshold,
a median of the pairwise similarity score of the second set of CI is greater than a threshold,
a median of the pairwise similarity score of the first set of CI and the second set of CI is greater than a threshold,
a mode of the pairwise similarity score of the first set of CI is greater than a threshold,
a mode of the pairwise similarity score of the second set of CI is greater than a threshold,
a mode of the pairwise similarity score of the first set of CI and the second set of CI is greater than a threshold,
a percentile of the pairwise similarity score of the first set of CI is greater than a threshold,
a percentile of the pairwise similarity score of the second set of CI is greater than a threshold,
a percentile of the pairwise similarity score of the first set of CI and the second set of CI is greater than a threshold,
a smallest pairwise similarity score of the first set of CI is greater than a threshold,
a smallest pairwise similarity score of the second set of CI is greater than a threshold,
a smallest pairwise similarity score of the first set of CI and the second set of CI is greater than a threshold,
a weighted mean of the pairwise similarity score of the first set of CI is greater than a threshold,
a weighted mean of the pairwise similarity score of the second set of CI is greater than a threshold,
a weighted mean of the pairwise similarity score of the first set of CI and the second set of CI is greater than a threshold,
a variance of the pairwise similarity score of the first set of CI is less than a threshold,
a variance of the pairwise similarity score of the second set of CI is less than a threshold,
a variance of the pairwise similarity score of the first set of CI and the second set of CI is less than a threshold,
a mean of a pairwise similarity score of the first set of CI from a centroid of the plurality of CI is greater than a threshold,
a mean of a pairwise similarity score of the second set of CI from a centroid of the plurality of CI is greater than a threshold,
a mean of a pairwise similarity score of the first set of CI and the second set of CI from a centroid of the plurality of CI is greater than a threshold,
a median of the pairwise similarity score of the first set of CI from a centroid is greater than a threshold,
a median of the pairwise similarity score of the second set of CI from a centroid is greater than a threshold, a median of the pairwise similarity score of the first set of CI and the second set of CI from a centroid is greater than a threshold,
a mode of the pairwise similarity score of the first set of CI from a centroid is greater than a threshold,
a mode of the pairwise similarity score of the second set of CI from a centroid is greater than a threshold,
a mode of the pairwise similarity score of the first set of CI and the second set of CI from a centroid is greater than a threshold,
a percentile of the pairwise similarity score of the first set of CI from a centroid is greater than a threshold,
a percentile of the pairwise similarity score of the second set of CI from a centroid is greater than a threshold,
a percentile of the pairwise similarity score of the first set of CI and the second set of CI from a centroid is greater than a threshold,
a smallest pairwise similarity score of the first set of CI from a centroid is greater than a threshold,
a smallest pairwise similarity score of the second set of CI from a centroid is greater than a threshold,
a smallest pairwise similarity score of the first set of CI and the second set of CI from a centroid is greater than a threshold,
a weighted mean of the pairwise similarity score of the first set of CI from a centroid is greater than a threshold,
a weighted mean of the pairwise similarity score of the second set of CI from a centroid is greater than a threshold,
a weighted mean of the pairwise similarity score of the first set of CI and the second set of CI from a centroid is greater than a threshold,
a variance of the pairwise similarity score of the first set of CI from a centroid is less than a threshold,
a variance of the pairwise similarity score of the second set of CI from a centroid is less than a threshold,
a variance of the pairwise similarity score of the first set of CI and the second set of CI from a centroid is less than a threshold,
a variance of the first set of CI is less than a threshold,
a variance of the second set of CI is less than a threshold,
a variance of the first set of CI and the second set of CI is less than a threshold,
a mean distance of the first set of CI from a centroid is less than a threshold,
a mean distance of the second set of CI from a centroid is less than a threshold,
a mean distance of the first set of CI and the second set of CI from a centroid is less than a threshold,
a central moment of the first set of CI is less than a threshold,
a central moment of the second set of CI is less than a threshold,
a central moment of the first set of CI and the second set of CI is less than a threshold,
a kurtosis of the first set of CI is less than a threshold,
a kurtosis of the second set of CI is less than a threshold,
a kurtosis of the first set of CI and the second set of CI is less than a threshold,
a tailedness measure of the first set of CI is less than a threshold,
a tailedness measure of the second set of CI is less than a threshold,
a tailedness measure of the first set of CI and the second set of CI is less than a threshold,
an outlier measure of the first set of CI is less than a threshold,
an outlier measure of the second set of CI is less than a threshold, or
an outlier measure of the first set of CI and the second set of CI is less than a threshold.

22. The method of claim 1, further comprising at least one of:
monitoring a motion of an object in the venue based on the TSCI, wherein the wireless multipath channel is impacted by the motion of the object in the venue;
computing a characteristics of the motion of the object based on the TSCI, wherein the characteristics comprises at least one of: a frequency of a repeating motion, a frequency characteristics, a vital characteristics, a breathing rate, a heart rate, a frequency spectrum, a period of the repeating motion, a temporal characteristics, a temporal profile, a time, a timing, a starting time, an ending time, a duration, a history, a trend, a prediction, a motion type, a motion characteristics, a motion intensity, a motion measure, a motion classification, an identity, a presence, a proximity, a proximity, a count, a people count, a location, a geometry, a speed, a velocity, a displacement, a distance, a range, a direction, an angle, an acceleration, a rotational speed, a rotational characteristics, a gait cycle of the object, gesture, a transient behavior of the object, a transient motion, a change, a change in the motion, a change in frequency, a change of period, a change of gait cycle, an event, a sudden motion, or a fall-down event;
computing a current characteristics of the motion of the object based on at least one of: the TSCI or a past characteristics of the motion of the object;
computing the current characteristics of the motion of the object based on at least one of: a current window of the TSCI or the past characteristics;
computing the past characteristics of the motion of the object based on at least one of: a past window of the TSCI; or
generating a presentation associated with the task in a user-interface (UI) of a user device, wherein the task is performed based on the characteristics of the motion of the object, wherein the task comprises at least one of:
object detection, presence detection, proximity detection, object recognition, activity recognition, object verification, object counting,
daily activity monitoring, well-being monitoring, vital sign monitoring, health condition monitoring, baby monitoring, elderly monitoring, sleep monitoring, sleep stage monitoring, walking monitoring, exercise monitoring,
tool detection, tool recognition, tool verification,
patient detection, patient monitoring, patient verification,
machine detection, machine recognition, machine verification,
human detection, human recognition, human verification,
baby detection, baby recognition, baby verification,
human breathing detection, human breathing recognition, human breathing estimation, human breathing verification,
human heart beat detection, human heart beat recognition, human heart beat estimation, human heart beat verification, fall-down detection, fall-down recognition, fall-down estimation, fall-down verification,
emotion detection, emotion recognition, emotion estimation, emotion verification,
motion detection, motion degree estimation, motion recognition, motion estimation, motion verification,
periodic motion detection, periodic motion recognition, periodic motion estimation, periodic motion verification,
repeated motion detection, repeated motion recognition, repeated motion estimation, repeated motion verification,
stationary motion detection, stationary motion recognition, stationary motion estimation, stationary motion verification,
cyclo-stationary motion detection, cyclo-stationary motion recognition, cyclo-stationary motion estimation, cyclo-stationary motion verification,
transient motion detection, transient motion recognition, transient motion estimation, transient motion verification,
trend detection, trend recognition, trend estimation, trend verification,
breathing detection, breathing recognition, breathing estimation, breathing verification,
human biometrics detection, human biometrics recognition, human biometrics estimation, human biometrics verification,
environment informatics detection, environment informatics recognition, environment informatics estimation, environment informatics verification,
gait detection, gait recognition, gait estimation, gait verification,
gesture detection, gesture recognition, gesture estimation, gesture verification,
machine learning, supervised learning, unsupervised learning, semi-supervised learning, clustering,
feature extraction, featuring training,
principal component analysis, eigen-decomposition, frequency decomposition, time decomposition, time-frequency decomposition, functional decomposition, other decomposition,
training, discriminative training, supervised training, unsupervised training, semi-supervised training, neural network,
sudden motion detection, fall-down detection, danger detection, life-threat detection, regular motion detection, stationary motion detection, cyclo-stationary motion detection,
intrusion detection, suspicious motion detection, security, safety monitoring,
navigation, guidance, map-based processing, map-based correction, irregularity detection, locationing, room sensing, tracking, multiple object tracking, indoor tracking, indoor position, indoor navigation,
energy management, power transfer, wireless power transfer, object counting, car tracking in parking garage, geometry estimation, augmented reality,
wireless communication, data communication, signal broadcasting, networking, coordination, administration, encryption, protection, or cloud computing.

23. The method of claim 1, further comprising:
obtaining a second TSCI of a second wireless multipath channel of the venue based on a second wireless signal transmitted from a second Type 1 device and received by a second Type 2 device, wherein one of the second Type 1 device and the second Type 2 device is a qualified device, and the other one is a to-be-qualified device;
performing a second qualification test based on the second TSCI;
determining the to-be-qualified device to be qualified based on a determination that a second qualification criterion associated with the second qualification test is satisfied.

24. The method of claim 23, further comprising at least one of:
updating a database of qualified devices associated with at least one of: the to-be-qualified device, the qualified device between the second Type 1 device and the second Type 2 device, the venue, the second wireless signal, the second wireless multipath channel, or at least one task associated with at least one of: the second qualification test or the second qualification criterion;
registering the to-be-qualified device as a qualified device; or
registering the to-be-qualified device as a qualified device for a task associated with at least one of: the second qualification test or the second qualification criterion.

25. The method of claim 23, further comprising:
obtaining a third TSCI of a third wireless multipath channel of the venue based on a third wireless signal transmitted between the to-be-qualified device that is determined to be qualified and an additional qualified device.

26. The method of claim 25, further comprising at least one of:
performing another task based on the third TSCI, wherein the second wireless multipath channel comprises the third wireless multipath channel;
sending, by the additional qualified device, an inquiry to a database of qualified devices associated with the venue;
obtaining, by the additional qualified device, from the database an information of the to-be-qualified device, wherein the information of the to-be-qualified device comprises at least one of: an identification information (ID) of the to-be-qualified device, a method to communicate with the to-be-qualified device, the second wireless multipath channel, the second wireless signal, a list of supported functionalities of the to-be-qualified device, or a coordination information between the to-be-qualified device and the additional qualified device;
coordinating the transmission and reception of the third wireless signal between the to-be-qualified device and the additional qualified device;
configuring the transmission and reception of the third wireless signal between the to-be-qualified device and the additional qualified device in compliance with at least one of: a protocol, a standard, or a signaling requirement; or
configuring at least one of the following of the third wireless signal: a sounding frequency, sounding period, sounding timing, carrier frequency, bandwidth, protocol, networking, signaling, handshaking, multiple access, channel traffic characteristics, channel availability characteristics, frequency hopping characteristics, choice of probe signal, or another signal characteristics.

27. The method of claim 25, wherein:
the qualified device is one of the Type 1 device or the Type 2 device;

the additional qualified device is the qualified device between the second Type 1 device and the second Type 2 device.

28. The method of claim 23, further comprising:
receiving a request associated with the to-be-qualified device;
determining, based on the TSCI, that the venue is in a suitable testing condition for the second qualification test, wherein both the Type 1 device and the Type 2 device are qualified;
coordinating the second Type 1 device to send the second wireless signal in the second wireless multipath channel of the venue and the second Type 2 device to receive the second wireless signal,
wherein the request comprises at least one of:
  a request from the to-be-qualified device to the qualified device,
  a request from the to-be-qualified device to at least one of: the Type 1 device, the Type 2 device, a processor of the Type 2 device or a memory of the Type 2 device,
  a request from the to-be-qualified device to a server communicatively coupled with the qualified device,
  a request for qualification of the to-be-qualified device,
  a request for the to-be-qualified device to be qualified as a qualified Type 1 device,
  a request for the to-be-qualified device to be qualified as a qualified Type 1 device for at least one second task,
  a request for the to-be-qualified device to be qualified as a qualified Type 2 device,
  a request for the to-be-qualified device to be qualified as a qualified Type 2 device for the at least one second task,
  a request for the to-be-qualified device to be qualified as both a qualified Type 1 device and a qualified Type 2 device,
  a request for the to-be-qualified device to be qualified as both a qualified Type 1 device and a qualified Type 2 device for the at least one second task,
  a request for commencing the at least one second task with the to-be-qualified device,
  a request for the to-be-qualified device to join the at least one second task,
  a request for performing the second qualification test for the to-be-qualified device,
  a request for performing the second qualification test associated with at least one second task for the to-be-qualified device,
  a request for the to-be-qualified device to join a group of qualified devices,
  a request for the to-be-qualified device to join a group of qualified devices associated with at least one second task,
  a request for the to-be-qualified device to join a group of qualified devices associated with at least one of: a Type 1 device or a Type 2 device associated with the at least one second task,
  a request for transmission and reception of the second wireless signal in the venue for at least one of: the second qualification test or the at least one second task,
  a request for usage of the second wireless multipath channel in the venue for at least one of: the second qualification test or the at least one second task,
  a request for transmission and reception of the second wireless signal in the second wireless multipath channel for at least one of: the second qualification test or the at least one second task, or
  another request;
wherein the suitable testing condition comprises at least one of:
  no detectable motion is detected in a motion detection test based on the TSCI,
  motion level is low in a motion detection test based on the TSCI,
  no detectable change is detected in a change detection test based on the TSCI,
  the wireless multipath channel is stationary in a stationarity test based on the TSCI,
  the wireless multipath channel is steady in a steadiness test based on the TSCI,
  the channel traffic of the wireless multipath channel is low,
  the noise level in wireless multipath channel traffic is low,
  a target object motion associated with at least one of: the second qualification test or a task associated with the second qualification test, is detected based on the TSCI,
  the target object motion is anticipated based on the TSCI,
  the target object motion is successfully monitored based on the TSCI,
  the target repeatable object motion is detected based on the TSCI, or
  another condition of the channel based on the TSCI.

29. The method of claim 1, further comprising:
obtaining a second TSCI of a second wireless multipath channel of the venue based on a second wireless signal transmitted from a second Type 1 device and received by a second Type 2 device, wherein both the second Type 1 device and the second Type 2 device are to-be-qualified devices;
performing a second qualification test based on the second TSCI;
determining both the to-be-qualified devices to be qualified based on a determination that a second qualification criterion associated with the second qualification test is satisfied.

30. A qualified wireless system, comprising:
a Type 1 heterogeneous wireless device configured for transmitting a wireless signal through a wireless multipath channel of a venue;
a Type 2 heterogeneous wireless device configured for:
  receiving the wireless signal,
  collecting a time series of channel information (TSCI) of the wireless multipath channel based on the wireless signal, wherein the TSCI comprises: a first channel information (CI) collected at a first time during a testing phase of a wireless monitoring, and a second CI collected at a second time during the testing phase of the wireless monitoring; and
a processor communicatively coupled with a memory storing a set of instructions, and configured for:
  performing a qualification test based on the TSCI for at least one to-be-qualified device, which is at least one of: the Type 1 device, a module of the Type 1 device, an integrated circuit (IC) of the Type 1 device, the Type 2 device, a module of the Type 2 device, or an IC of the Type 2 device, to determine whether each of the at least one to-be-qualified device is a qualified device or a disqualified device with respect to a task related to the wireless monitoring, determining that each of the at least one to-be-qualified device is a qualified device based on a determination that a respective qualification criterion associated with the to-be-qualified device is satisfied, to obtain at least one qualified device, wherein the respective qualification criterion comprises that:
a similarity score between a feature of the first CI and the feature of a predictor is greater than a first threshold, wherein the predictor is a prediction of the first CI based on the second CI, wherein the first CI and the second CI are collected at the first time and the second time respectively during the testing phase of the wireless monitoring, and
a difference between the first time and the second time is less than a second threshold, and
performing the task based on the TSCI using the at least one qualified device.

\* \* \* \* \*